(12) United States Patent
Ko et al.

(10) Patent No.: US 8,996,550 B2
(45) Date of Patent: Mar. 31, 2015

(54) AUTOCOMPLETION FOR PARTIALLY ENTERED QUERY

(75) Inventors: David H. Ko, San Lorenzo, CA (US); Ching Law, Hong Kong (HK); Kayi Lee, Newton, MA (US); Chi Yung Tse, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 13/376,364

(22) PCT Filed: Jun. 3, 2010

(86) PCT No.: PCT/CN2010/073498
§ 371 (c)(1),
(2), (4) Date: Mar. 14, 2012

(87) PCT Pub. No.: WO2010/139277
PCT Pub. Date: Dec. 9, 2010

(65) Prior Publication Data
US 2012/0166182 A1   Jun. 28, 2012

Related U.S. Application Data

(60) Provisional application No. 61/183,932, filed on Jun. 3, 2009.

(51) Int. Cl.
*G06F 17/30* (2006.01)
*G06F 17/27* (2006.01)
*G06F 17/28* (2006.01)

(52) U.S. Cl.
CPC .......... *G06F 17/276* (2013.01); *G06F 17/3064* (2013.01); *G06F 17/289* (2013.01)
USPC ................ 707/758; 704/8; 704/9; 715/256; 715/264

(58) Field of Classification Search
CPC .................... G06F 17/30386; G06F 17/30554

USPC .......... 704/8–9; 707/722, 727, 758; 715/256, 715/264
See application file for complete search history.

(56) References Cited

U.S. PATENT DOCUMENTS 5,270,927 A * 12/1993 Sproat ........................... 715/264
5,649,222 A   7/1997 Mogilevsky
(Continued)

FOREIGN PATENT DOCUMENTS

CN   1670723 A   9/2005
CN   101268463 A   9/2008
(Continued)

OTHER PUBLICATIONS

Google Inc., Office Action, CN 201080032696.6, Feb. 16, 2013, 10 pgs.
(Continued)

*Primary Examiner* — Shaun Roberts
(74) *Attorney, Agent, or Firm* — Morgan, Lewis & Bockius LLP

(57) ABSTRACT

A server system receives, respectively, a first character string from a first user and a second character string from a second user. There are one or more differences between the first and second character strings. The server system obtains from a plurality of previously submitted complete queries, respectively, a first set of predicted complete queries corresponding to the first character string and a second set of predicted complete queries corresponding to the second character string. There are one or more identical queries in both the first and second sets. The server system conveys at least a first subset of the first set to the first user and at least a second subset of the second set to the second user. Both the first subset and the second subset include a respective identical query.

18 Claims, 17 Drawing Sheets

(56) References Cited

U.S. PATENT DOCUMENTS

| | | | |
|---|---|---|---|
| 5,687,364 | A | 11/1997 | Saund et al. |
| 5,761,436 | A | 6/1998 | Nielsen |
| 5,805,911 | A | 9/1998 | Miller |
| 5,845,300 | A | 12/1998 | Comer et al. |
| 5,873,107 | A | 2/1999 | Borovoy et al. |
| 5,892,919 | A | 4/1999 | Nielsen |
| 5,907,680 | A | 5/1999 | Nielsen |
| 5,920,854 | A | 7/1999 | Kirsch et al. |
| 5,954,798 | A | 9/1999 | Shelton et al. |
| 5,995,928 | A | 11/1999 | Nguyen et al. |
| 6,006,225 | A | 12/1999 | Bowman et al. |
| 6,032,162 | A | 2/2000 | Burke |
| 6,037,934 | A | 3/2000 | Himmel et al. |
| 6,041,360 | A | 3/2000 | Himmel et al. |
| 6,067,565 | A | 5/2000 | Horvitz |
| 6,096,096 | A | 8/2000 | Murphy et al. |
| 6,125,361 | A | 9/2000 | Chakrabarti et al. |
| 6,144,958 | A | 11/2000 | Ortega et al. |
| 6,199,986 | B1 | 3/2001 | Williams et al. |
| 6,243,071 | B1 | 6/2001 | Shwarts et al. |
| 6,278,449 | B1 | 8/2001 | Sugiarto et al. |
| 6,281,886 | B1 | 8/2001 | Ranieri |
| 6,321,228 | B1 | 11/2001 | Crandall et al. |
| 6,324,566 | B1 | 11/2001 | Himmel et al. |
| 6,356,908 | B1 | 3/2002 | Brown et al. |
| 6,377,965 | B1 | 4/2002 | Hachamovitch et al. |
| 6,393,389 | B1 | 5/2002 | Chanod et al. |
| 6,411,948 | B1 | 6/2002 | Hetherington et al. |
| 6,493,702 | B1 | 12/2002 | Adar et al. |
| 6,546,388 | B1 | 4/2003 | Edlund et al. |
| 6,546,393 | B1 | 4/2003 | Khan |
| 6,564,213 | B1 | 5/2003 | Ortega et al. |
| 6,598,051 | B1 | 7/2003 | Wiener et al. |
| 6,631,496 | B1 | 10/2003 | Li et al. |
| 6,647,383 | B1 | 11/2003 | August et al. |
| 6,687,689 | B1 | 2/2004 | Fung et al. |
| 6,704,727 | B1 | 3/2004 | Kravets |
| 6,708,250 | B2 | 3/2004 | Gillingham |
| 6,735,592 | B1 | 5/2004 | Neumann et al. |
| 6,751,606 | B1 | 6/2004 | Fries et al. |
| 6,778,979 | B2 | 8/2004 | Grefenstette et al. |
| 6,801,659 | B1 * | 10/2004 | O'Dell ................... 382/185 |
| 6,819,336 | B1 | 11/2004 | Nielsen |
| 6,832,218 | B1 | 12/2004 | Emens et al. |
| 6,876,997 | B1 | 4/2005 | Rorex et al. |
| 6,956,968 | B1 | 10/2005 | O'Dell et al. |
| 7,031,961 | B2 | 4/2006 | Pitkow et al. |
| 7,111,000 | B2 | 9/2006 | Wen et al. |
| 7,124,129 | B2 | 10/2006 | Bowman et al. |
| 7,149,970 | B1 | 12/2006 | Pratley et al. |
| 7,152,059 | B2 | 12/2006 | Monteverde |
| 7,152,064 | B2 | 12/2006 | Bourdoncle et al. |
| 7,181,438 | B1 | 2/2007 | Szabo |
| 7,181,447 | B2 | 2/2007 | Curtis et al. |
| 7,188,304 | B2 | 3/2007 | Morimoto et al. |
| 7,216,290 | B2 | 5/2007 | Goldstein et al. |
| 7,293,231 | B1 | 11/2007 | Gunn et al. |
| 7,395,203 | B2 * | 7/2008 | Wu et al. ................. 704/235 |
| 7,467,131 | B1 | 12/2008 | Gharachorloo et al. |
| 7,626,574 | B2 * | 12/2009 | Kim ........................ 345/168 |
| 7,660,815 | B1 | 2/2010 | Scofield et al. |
| 7,689,540 | B2 | 3/2010 | Chowdhury et al. |
| 7,747,639 | B2 | 6/2010 | Kasperski et al. |
| 7,752,326 | B2 | 7/2010 | Smit |
| 7,801,896 | B2 | 9/2010 | Szabo |
| 7,844,590 | B1 | 11/2010 | Zwicky et al. |
| 7,890,526 | B1 | 2/2011 | Brewer et al. |
| 7,941,762 | B1 | 5/2011 | Tovino et al. |
| 7,966,003 | B2 | 6/2011 | Longe et al. |
| 8,005,919 | B2 | 8/2011 | Mehanna et al. |
| 8,060,639 | B2 | 11/2011 | Smit et al. |
| 8,069,028 | B2 * | 11/2011 | Scott et al. ................... 704/2 |
| 8,112,529 | B2 | 2/2012 | Van Den Oord et al. |
| 8,312,032 | B2 * | 11/2012 | Choi et al. ............... 707/758 |
| 8,395,586 | B2 * | 3/2013 | Fux et al. ................. 345/171 |

| | | | |
|---|---|---|---|
| 2001/0047355 | A1 | 11/2001 | Anwar |
| 2002/0023145 | A1 | 2/2002 | Orr et al. |
| 2002/0078045 | A1 | 6/2002 | Dutta |
| 2002/0158779 | A1 * | 10/2002 | Ouyang ................... 341/28 |
| 2002/0174145 | A1 | 11/2002 | Duga et al. |
| 2002/0187815 | A1 | 12/2002 | Deeds et al. |
| 2003/0023582 | A1 | 1/2003 | Bates et al. |
| 2003/0037050 | A1 | 2/2003 | Monteverde |
| 2003/0041147 | A1 | 2/2003 | van den Oord et al. |
| 2003/0135725 | A1 | 7/2003 | Schirmer et al. |
| 2003/0143979 | A1 | 7/2003 | Suzuki et al. |
| 2003/0145087 | A1 | 7/2003 | Keller et al. |
| 2003/0179930 | A1 * | 9/2003 | O'Dell et al. ............ 382/187 |
| 2003/0212563 | A1 | 11/2003 | Ju et al. |
| 2003/0220913 | A1 | 11/2003 | Doganata et al. |
| 2004/0010520 | A1 | 1/2004 | Tsang et al. |
| 2004/0064577 | A1 | 4/2004 | Dahlin et al. |
| 2004/0205501 | A1 | 10/2004 | Gupta |
| 2004/0230574 | A1 | 11/2004 | Kravets |
| 2004/0254928 | A1 | 12/2004 | Vronay et al. |
| 2005/0080771 | A1 | 4/2005 | Fish |
| 2005/0149507 | A1 | 7/2005 | Nye |
| 2005/0203878 | A1 | 9/2005 | Brill et al. |
| 2005/0210383 | A1 | 9/2005 | Cucerzan et al. |
| 2005/0246211 | A1 | 11/2005 | Kaiser |
| 2005/0256846 | A1 | 11/2005 | Zigmond et al. |
| 2005/0283468 | A1 | 12/2005 | Kamvar et al. |
| 2006/0106769 | A1 | 5/2006 | Gibbs |
| 2006/0195435 | A1 | 8/2006 | Laird-McConnell et al. |
| 2006/0224871 | A1 | 10/2006 | Tran |
| 2006/0259479 | A1 | 11/2006 | Dai |
| 2007/0050352 | A1 | 3/2007 | Kim |
| 2007/0100890 | A1 | 5/2007 | Kim |
| 2007/0143262 | A1 | 6/2007 | Kasperski |
| 2007/0156677 | A1 | 7/2007 | Szabo |
| 2007/0288648 | A1 | 12/2007 | Mehanna et al. |
| 2008/0040323 | A1 | 2/2008 | Joshi |
| 2008/0201227 | A1 | 8/2008 | Bakewell et al. |
| 2009/0119289 | A1 | 5/2009 | Gibbs et al. |
| 2011/0258183 | A1 | 10/2011 | Gibbs et al. |
| 2011/0271095 | A1 | 11/2011 | Bharat et al. |
| 2011/0314021 | A1 | 12/2011 | Gibbs et al. |

FOREIGN PATENT DOCUMENTS

| | | |
|---|---|---|
| EP | 1359516 A2 | 11/2003 |
| JP | 2001/249933 A | 9/2001 |
| JP | 10-141970 A | 6/2010 |
| WO | WO 00/57265 | 9/2000 |
| WO | WO 2005/033967 A2 | 4/2005 |
| WO | WO 2006/055120 A2 | 5/2006 |
| WO | WO 2009/021204 A2 | 2/2009 |

OTHER PUBLICATIONS

International Search Report and Written Opinion, PCT/CN2010/073498, Sep. 9, 2010, 9 pages.

Anick, The Paraphrase Search Assistant: Terminological Feedback for Iterative Information Seeking, Aug. 1999, 7 pgs.

Cruz, A User Interface for Distributed Multimedia Database Querying with Mediator Supported Refinement, IDEAS '99, Aug. 2-4, 1999, 9 pgs.

Djabarov, Amendment After Final, U.S. Appl. No. 11/321,075, Oct. 7, 2010, 30 pgs.

Djabarov, Amendment After Final, U.S. Appl. No. 11/321,075, Jun. 25, 2009, 51 pgs.

Djabarov, Amendment, U.S. Appl. No. 11/321,075, Feb. 12, 2009, 39 pgs.

Djabarov, Amendment, U.S. Appl. No. 11/321,075, Mar. 25, 2010, 40 pgs.

Djabarov, Amendment, U.S. Appl. No. 11/321,075, Jul. 30, 2008, 45 pgs.

Gery, Evaluation of web usage mining approaches for user's next request prediction, Nov. 2003, 8 pgs.

Gibbs, Amendment After Allowance, U.S. Appl. No. 13/243,668, May 31, 2012, 7 pgs.

Gibbs, Amendment, U.S. Appl. No. 10/987,294, Aug. 6, 2007, 20 pgs.

(56) References Cited

OTHER PUBLICATIONS

Gibbs, Amendment, U.S. Appl. No. 10/987,295, Aug. 6, 2007, 21 pgs.
Gibbs, Amendment, U.S. Appl. No. 10/987,769, Sep. 8, 2009, 19 pgs.
Gibbs, Amendment, U.S. Appl. No. 10/987,769, Aug. 21, 2008, 23 pgs.
Gibbs, Amendment, U.S. Appl. No. 12/345,564, Apr. 18, 2011, 16 pgs.
Gibbs, Amendment, U.S. Appl. No. 12/360,076, Mar. 28, 2010, 8 pgs.
Gibbs, Amendment, U.S. Appl. No. 13/167,591, Feb. 22, 2012, 11 pgs.
Gibbs, Appellant's Brief, U.S. Appl. No. 10/987,769, Jun. 28, 2010, 37 pgs.
Gibbs, Appellant's Brief, U.S. Appl. No. 12/345,564, Oct. 31, 2011, 24 pgs.
Gibbs, Appellant's Reply Brief, U.S. Appl. No. 12/345,564, Feb. 16, 2012, 13 pgs.
Gibbs, Reply Brief, U.S. Appl. No. 10/987,769, Nov. 16, 2010, 9 pgs.
Gibbs, Response to Final OA, U.S. Appl. No. 10/987,294, Jan. 14, 2008, 11 pgs.
Gibbs, Response to Final OA, US 10/987,295, May 12, 2008, 13 pgs.
Gibbs, Response to Final OA, U.S. Appl. No. 10/987,295, Jan. 14, 2008, 13 pgs.
Gibbs, Response to Final OA, U.S. Appl. No. 10/987,769, Mar. 10, 2010, 19 pgs.
Gibbs, Response to Final OA, U.S. Appl. No. 10/987,769, Mar. 26, 2009, 22 pgs.
Gibbs, Response to Final OA, U.S. Appl. No. 12/345,564, Aug. 1, 2011, 13 pgs.
Gibbs, Response to Office Action, U.S. Appl. No. 10/987,294, Sep. 12, 2008, 17 pgs.
Gibbs, Response to Office Action, U.S. Appl. No. 10/987,295, Sep. 12, 2008, 15 pgs.
Gibbs, Supplemental Response to Final OA, U.S. Appl. No. 10/987,294, May 12, 2008, 13 pgs.
Gibbs, Supplemental Response to Final OA, U.S. Appl. No. 10/987,769, Mar. 23, 2010, 17 pgs.
Gibbs, Supplemental Response to Final OA, U.S. Appl. No. 12/345,564, Aug. 5, 2011, 13 pgs.
Google Inc., Decision of Rejection, CN 201080032696.6, May 29, 2014, 10 pgs.
Google Inc., IPRP, PCT/US2006/062651, Jul. 1, 2008, 7 pgs.
Google Inc., ISR, PCT/US2006/062651, Mar. 21, 2007, 11 pgs.
Google Inc., ISR/WO, PCT/US2005/036553, May 11, 2006, 4 pgs.
Google Inc., ISR/WO, PCT/US2008/072678, Apr. 9, 2009, 10 pgs.
Google Inc., ISR/WO, PCT/US2009/048668, Jan. 27, 2010, 12 pgs.
Google Inc., Notice of Final Rejection, KR 2007-7013174, Dec. 26, 2012, 4 pgs.
Google Inc., Notice of Reasons for Rejection, JP 2012-046492, Jun. 20, 2013, 4 pgs.
Google Inc., Notice of the Result of the Re-examination Prior to Trial, KR 10-2007-7013174, May 30, 2013, 2 pgs.
Google Inc., Notice to File a Response, KR 2007-7013174, Jun. 1, 2012, 6 pgs.
Google Inc., Notice to File a Response, KR 2010-7005258, Jun. 20, 2014, 7 pgs.
Google Inc., Notification of the Second Office Action, CN 201080032696.6, Sep. 13, 2013, 10 pgs.
Google Inc., Office Action, CN 200880110208.1, Jul. 26, 2011, 10 pgs.
Google Inc., Office Action, JP 2007-541185, Nov. 2, 2011, 2 pgs.
Google Web Help—Google Suggest, Jun. 17, 2010, 2 pgs.
Hoong, Guided Google: A Meta Search Engine and Its Implementation Using the Google Distributed Web Services, Feb. 13, 2003, 8 pgs.
Kamvar, Amendment and Substance of Interview, U.S. Appl. No. 13/402,840, Apr. 17, 2014, 11 pgs.
Kamvar, Amendment, U.S. Appl. No. 10/875,143, Jan. 9, 2008, 11 pgs.
Kamvar, Amendment, U.S. Appl. No. 10/875,143, Aug. 28, 2008, 12 pgs.
Kamvar, Amendment, U.S. Appl. No. 12/916,330, Oct. 4, 2011, 7 pgs.
Kamvar, Amendment, U.S. Appl. No. 13/245,701, Apr. 23, 2012, 7 pgs.
Kamvar, Amendment, U.S. Appl. No. 13/402,835, Apr. 10, 2013, 12 pgs.
Kamvar, Amendment, U.S. Appl. No. 13/402,835, May 15, 2014, 12 pgs.
Kamvar, Amendment, U.S. Appl. No. 13/402,840, Apr. 10, 2013, 9 pgs.
Kamvar, Preliminary Amendment, U.S. Appl. No. 12/916,330, Apr. 22, 2011, 6 pgs.
Kamvar, Response to Final Office Action, U.S. Appl. No. 10/875,143, Mar. 9, 2009, 11 pgs.
Kamvar, Response to Final Office Action, U.S. Appl. No. 13/402,835, Jan. 29, 2014, 10 pgs.
Kamvar, Response to Office Action, U.S. Appl. No. 10/875,143, Sep. 22, 2009, 13 pgs.
Kamvar, Response to Office Action, U.S. Appl. No. 10/875,143, Mar. 29, 2010, 16 pgs.
Kamvar, Supplemental Amendment, U.S. Appl. No. 10/875,143, Apr. 8, 2009, 10 pgs.
Kim, Amendment, U.S. Appl. No. 12/188,163, Jun. 17, 2011, 15 pgs.
Kim, Appellant's Brief, U.S. Appl. No. 12/188,163, Apr. 9, 2012, 34 pgs.
Kim, Response to Final OA, U.S. Appl. No. 12/188,163, Jan. 6, 2012, 12 pgs.
Koester, Conceptual Knowledge Processing with Google, 6 pgs, 2005.
Kolvenbach, A Toolbar for Efficient Interaction in Online Communities, Sep. 2005, 8 pgs.
Lam, Automatic Text Categorization and Its Application to Text Retrieval, Nov.-Dec. 1999, 15 pgs.
Lempel, Predictive caching and prefetching of query results in search engines, May 2003, 10 pgs.
Partial and full URLs, maps.fsl.noaa.gov/moniger/web101/1-lecture/partial.html, 1996, 2 pgs.
Penas, Browsing by phrases: terminological information in interactive multilingual text retrieval, JCDL '01, Jun. 24-28, 2001, 2 pgs.
Richardson, Mac User Makes Auto Complete Search Function for Safari, Jul. 19, 2005, 2 pgs.
Varghese, Google Suggest Comes Online, Dec. 15, 2004, 1 pg.
Wang, An approach toward web caching and prefetching for database management system, SIGMOD 2001, May 21-23, 2001, 9 pgs.
Watanabe, DWBlog—Inquisitor 1.0, Jun. 28, 2010, 4 pgs.

\* cited by examiner

USER SURVEY DATA — 201

|  | User 1 | User 2 | User 3 | User 4 |
|---|---|---|---|---|
| 抹(maat)布 | mak | mak | mak | mut |
| 抹(mut)殺 | mu | mu | mak | mut |
| 茉(mut)莉 | mu | mut | mu | mu |

$F(user, jp, kp) = K(user, jp, kp)/T(user, jp)$ — 203

|  | User 1 | User 2 | User 3 | User 4 |
|---|---|---|---|---|
| maat | 1/1 (mak) | 1/1 (mak) | 1/1 (mak) | 1/1 (mut) |
| mut | 2/2 (mu) | ½ (mu), ½ (mut) | ½ (mak), ½ (mu) | ½ (mut), ½ (mu) |

$G(jp, kp) = [F(user1, jp, kp) + F(user2, jp, kp) + ... + F(userN, jp, kp)]/N$ $H(C, kp) = w_1 G(jp_1, kp) + w_2 G(jp_2, kp) + ... + w_M G(jp_M, kp)$

AUTOCOMPLETION FOR PARTIALLY ENTERED QUERY

CROSS REFERENCE TO RELATED APPLICATIONS

This Application is a United States National Stage Application filed under 35 U.S.C. §371 of PCT Patent Application Serial No. PCT/CN2010/073498 filed on Jun. 3, 2010, which claims the benefit of and priority to U.S. Provisional Patent Application Ser. No. 61/183,932 filed on Jun. 3, 2009, both of which are hereby incorporated by reference in their entireties.

RELATED APPLICATIONS

This application is related to commonly-assigned U.S. Utility patent application Ser. No. 10/987,295, filed on Nov. 11, 2004, "Method and System for Autocompletion Using Ranked Results," now U.S. Pat. No. 7,487,145, Ser. No. 10/987,769, filed Nov. 12, 2004, entitled "Method and System for Autocompletion for Languages Having Ideographs and Phonetic Characters," and Ser. No. 12/188,163, filed Aug. 7, 2008, entitled "Autocompletion and Automatic Input Method Correction for Partially Entered Query," the contents of which are incorporated by reference herein in their entireties.

TECHNICAL FIELD

The disclosed embodiments relate generally to search engines for locating documents in a computer network (e.g., a distributed system of computer systems), and in particular, to a system and method for accelerating a desired search by providing query suggestions in response to a partial query provided by a user.

BACKGROUND

Search engines provide a powerful tool for locating documents in a large database of documents, such as the documents on the World Wide Web (WWW) or the documents stored on the storage devices of an Intranet. The documents are located in response to a query submitted by a user. A query typically consists of one or more query terms. To reduce its latency in response to a search request by a user, a search engine may generate a list of predicted queries based on a partial query entered by the user. The user may select a desired one from the ordered list of predicted queries, or may complete the partial query if, e.g., none of the predicted queries corresponds to the query that the user intends to submit.

SUMMARY

In accordance with some embodiments described below, a computer-implemented method is performed at a server system. The server system receives, respectively, a first character string from a first user and a second character string from a second user. There are one or more differences between the first and second character strings. The server system obtains from a plurality of previously submitted complete queries, respectively, a first set of predicted complete queries corresponding to the first character string and a second set of predicted complete queries corresponding to the second character string. There are one or more identical queries in both the first and second sets. The server system conveys at least a first subset of the first set to the first user and at least a second subset of the second set to the second user. Both the first subset and the second subset include a respective identical query.

In some embodiments, a computer system for processing query information includes one or more central processing units for executing programs, and memory to store data and programs to be executed by the one or more central processing units. The programs include instructions for receiving, respectively, a first character string from a first user and a second character string from a second user, wherein there are one or more differences between the first and second character strings; instructions for obtaining from a plurality of previously submitted complete queries, respectively, a first set of predicted complete queries corresponding to the first character string and a second set of predicted complete queries corresponding to the second character string, wherein there are one or more identical queries in both the first and second sets; and instructions for conveying at least a first subset of the first set to the first user and at least a second subset of the second set to the second user, wherein both the first subset and the second subset include a respective identical query.

In some embodiments, a computer readable-storage medium stores one or more programs for execution by one or more processors of a respective server system. The one or more programs include instructions for receiving, respectively, a first character string from a first user and a second character string from a second user, wherein there are one or more differences between the first and second character strings; instructions for obtaining from a plurality of previously submitted complete queries, respectively, a first set of predicted complete queries corresponding to the first character string and a second set of predicted complete queries corresponding to the second character string, wherein there are one or more identical queries in both the first and second sets; and instructions for conveying at least a first subset of the first set to the first user and at least a second subset of the second set to the second user, wherein both the first subset and the second subset include a respective identical query.

In accordance with some embodiments described below, a computer-implemented method is performed at a client device. The client device receives from one or more users of the client device, respectively, a first character string and a second character string. There are one or more differences between the first and second character strings. The client device obtains from a remote server system, respectively, a first set of predicted complete queries corresponding to the first character string and a second set of predicted complete queries corresponding to the second character string. There are one or more identical queries in both the first and second sets. The client device displays to the users of the client device at least a first subset of the first set to the first user and at least a second subset of the second set to the second user. Both the first subset and the second subset include a respective identical query.

In some embodiments, a client system includes one or more central processing units for executing programs, and memory to store data and programs to be executed by the one or more central processing units, the programs including instructions for receiving from a search requestor a partial query. The programs further include instructions for receiving, respectively, a first character string and a second character string, wherein there are one or more differences between the first and second character strings; obtaining from a remote server system, respectively, a first set of predicted complete queries corresponding to the first character string and a second set of predicted complete queries corresponding to the second character string, wherein there are one or more identical queries in both the first and second sets; and displaying at least a first subset of the first set to and at least a second subset of the second set to a respective user of the client device, wherein both the first subset and the second subset include a respective identical query.

In some embodiments, a computer readable-storage medium stores one or more programs for execution by one or more processors of a client device. The one or more programs include instructions for receiving, respectively, a first character string and a second character string, wherein there are one or more differences between the first and second character strings; obtaining from a remote server system, respectively, a first set of predicted complete queries corresponding to the first character string and a second set of predicted complete queries corresponding to the second character string, wherein there are one or more identical queries in both the first and second sets; and displaying at least a first subset of the first set to and at least a second subset of the second set to a respective user of the client device, wherein both the first subset and the second subset include a respective identical query.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIGS. 7A to 7G depict schematic screenshots of a web browser, a web page displayed in a web browser, or other user interface that lists predicted complete queries in English and Chinese corresponding to a user-provided partial query, in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
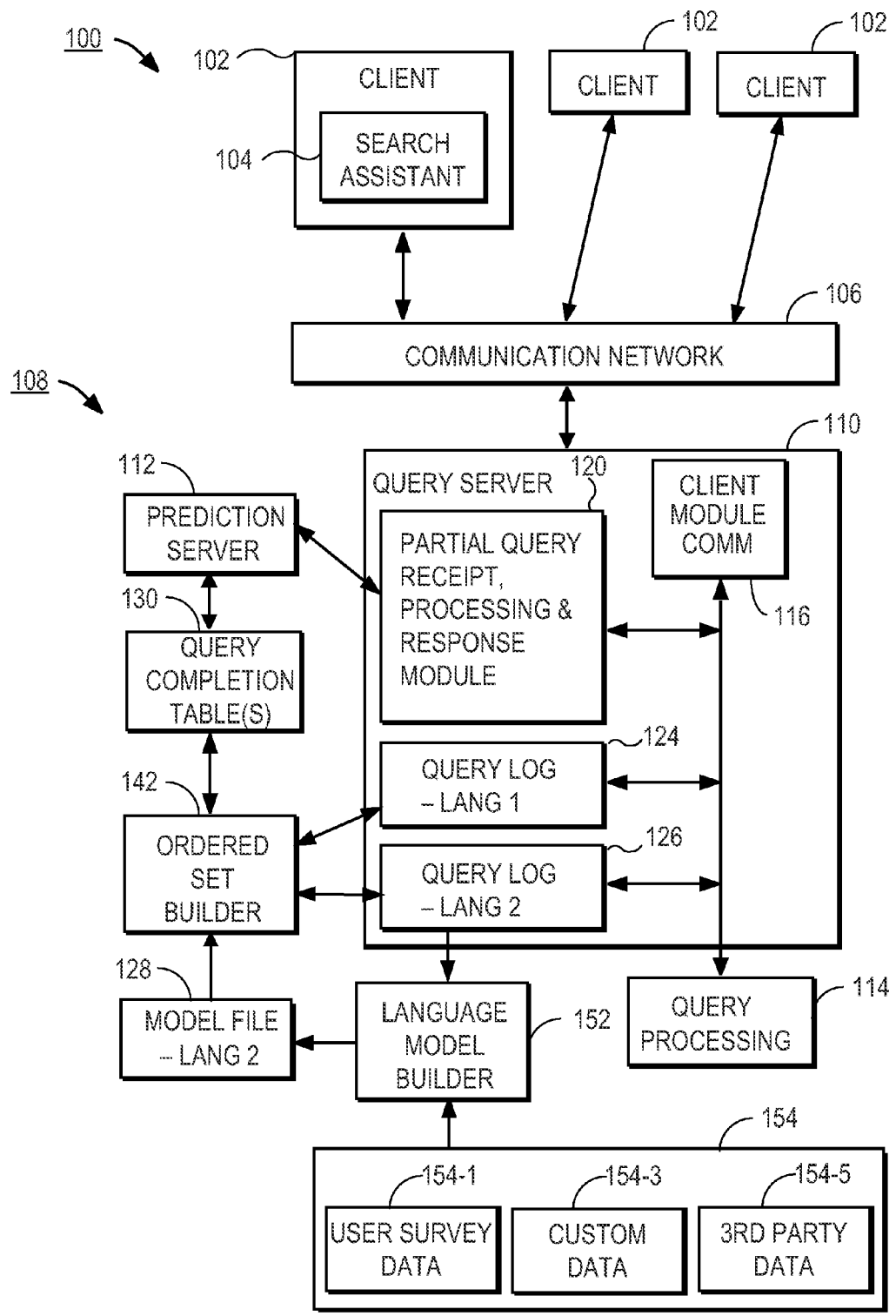
FIG. 1 is a block diagram of a search engine system in accordance with some embodiments.

FIG. 1 illustrates a distributed system 100, suitable for practice of embodiments of the invention. Additional details regarding the distributed system and its various functional components are provided in co-pending, commonly-assigned U.S. Utility patent application Ser. No. 10/987,295, "Method and System for Autocompletion Using Ranked Results," filed on Nov. 11, 2004, Ser. No. 10/987,769, "Method and System for Autocompletion for Languages Having Ideographs and Phonetic Characters," filed on Nov. 12, 2004, and Ser. No. 12/188,163, "Autocompletion and Automatic Input Method Correction for Partially Entered Query," filed on Aug. 7, 2008, the contents of which are incorporated by reference herein in their entireties.

The system 100 may include one or more client systems or devices 102 that are located remotely from a search engine 108. A respective client system 102, sometimes called a client or client device, may be a desktop computer, laptop computer, kiosk, mobile phone, personal digital assistant, or the like. A communication network 106 connects the client systems or devices 102 to the search engine 108. As a user (also called a search requestor herein) inputs a query at a client system 102, the client assistant 104 transmits at least a portion of the user-entered partial query to the search engine 108 before the user has completed the query. An embodiment of a process performed by the client assistant 104 is described below in connection with FIG. 4B. The search engine 108 uses the transmitted portion of the partial query to make one or more predictions of the user-intended query. These predictions are transmitted back to the client system 102 and displayed to the user. If one of the predictions is the user-intended query, the user can select the predicted query without having to continue entry of the query.

As further described herein, the system 100 and its functional components have been adapted so as to handle partial queries in multiple languages in a unified manner. The system 100 has been adapted so as to provide predicted queries based on the user's actual input at the client system 102, regardless of the language coding of the partial query transmitted by the client assistant 104 to the search engine 108. This is particularly useful, e.g., where a user has input a partial query using an incorrect input method editor setting at the client system 102.

The search engine 108 includes a query server 110, which has a module 120 that receives and processes partial queries and forwards the partial queries to a prediction server 112. In some embodiments, the query server 110, in addition, receives complete search queries and forwards the complete search queries to a query processing module 114. The prediction server 112 is responsible for generating a list of predicted complete queries corresponding to a received partial query. An embodiment of the process performed by the prediction server 112 is described below in connection with FIG. 4A. The prediction server 112 relies on data structures constructed by an ordered set builder 142 during a pre-processing phase. An exemplary method performed by the ordered set builder 142 is described below in connection with FIGS. 3A-3D. The ordered set builder 142 constructs the data structures using query logs in the different languages 124, 126 and a language-specific model file 128. The language-specific model file 128 is a collection of information that maps a respective non-Latin character string to one or more corresponding Latin character strings that are phonetic representations of the non-Latin character string.

Some languages or dialects such as Mandarin Chinese and Korean have a well-accepted phonetic representation scheme among their users. For example, this scheme in Mandarin Chinese is called "Pinyin" and every Chinese character has an official phonetic representation (or romanization) in a particular context. When a user inputs Chinese characters using the Pinyin scheme, any typographical error would result in either a different set of characters than expected or nothing at all (or perhaps an error message). But a widely-adopted standard or official scheme may not exist in some other languages or dialects. For example, Cantonese is a Chinese dialect that uses the same Chinese characters in writing as Mandarin, but often has significantly different pronunciations for the same character. For historical reasons, there is no scheme like Pinyin that is universally accepted by Cantonese speakers. As a result, different persons may choose different phonetic representations for the same character in Cantonese.

For example, for the Chinese character "德," some Cantonese speakers prefer the phonetic representation of "tak" while some others prefer the phonetic representation of "dak." In other words, the relationship between a Chinese character and its corresponding Cantonese phonetic representations is one-to-many even in the same context. The language-specific model file 128 for Cantonese is a data structure that defines one or more phonetic representations and their respective popularities among Cantonese speakers for a Chinese phrase or a single Chinese character. With this data structure, it is possible to predict what the corresponding Chinese character(s) should be in response to a user-entered phonetic representation in the form of a Latin character string and also to make query suggestions based on the predicted Chinese character(s).

Figure 2A:
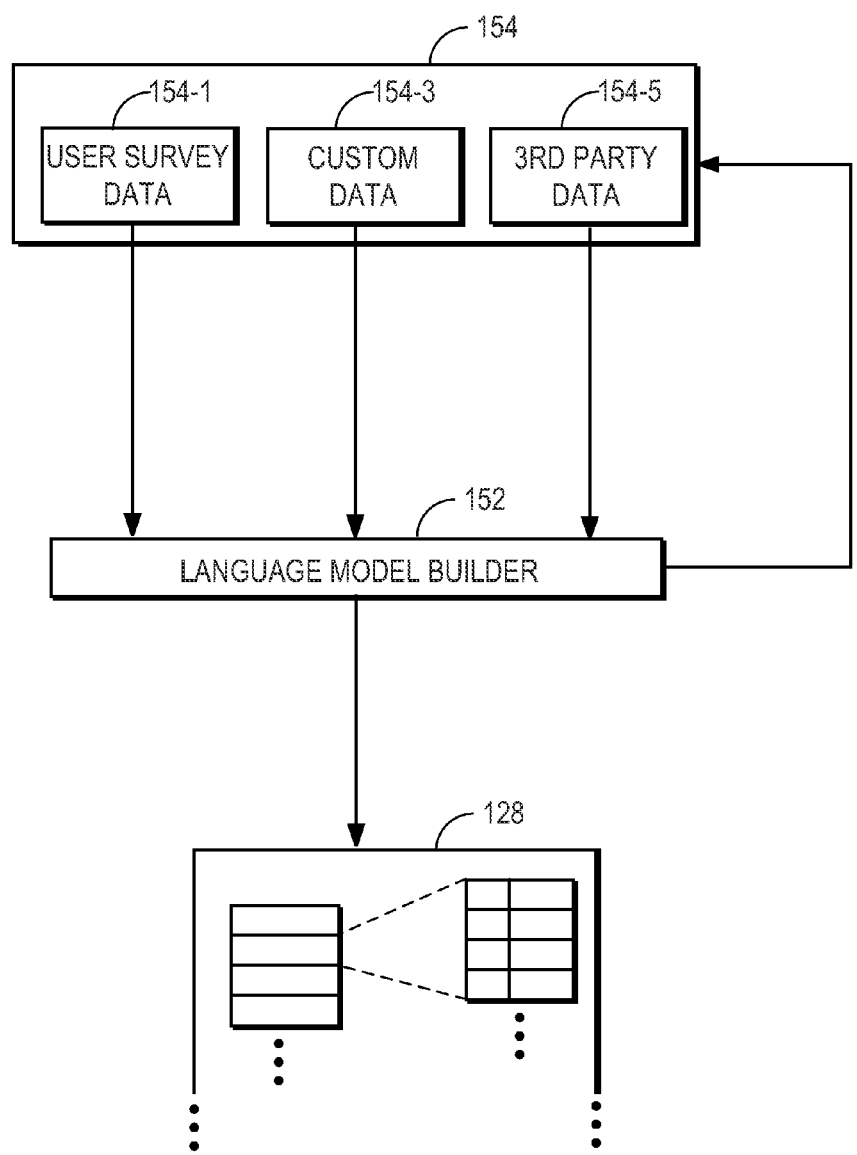
FIG. 2A is a conceptual diagram that depicts how a language-specific model file is built in accordance with some embodiments.

Referring to FIG. 2A, the diagram therein depicts how the language model builder 152 generates a language-specific model file 128 using data from one or more sources 154 including user survey data 154-1, custom data 154-3, and 3rd-party data 154-5 in accordance with some embodiments. For simplicity, this application uses Cantonese as an example. But the invention is applicable to other languages or dialects that have the same or similar problems, i.e., no standard Romanization scheme that is universally accepted or used by native speakers of a particular language or dialect.

The user survey data 154-1 may be collected by setting up a software application such as a web-based application. Cantonese speakers are invited to visit the application and provide their preferred phonetic representations of Chinese phrases/characters. A backend application analyzes these user inputs and generates a statistical model for each phrase or character.

Other ways of collecting the user survey data include regular email messages soliciting inputs from Cantonese speakers. A more detailed description of an embodiment of the user survey data analysis is provided below in connection with FIG. 2B.

Sometimes, the resulting statistical model might be affected by the population size and demographic distribution of those Cantonese speakers that contribute to the user survey data 154-1. Other data sources such as the custom data 154-3 and third-party data 154-5 can be used to improve the quality and completeness of the language-specific model file 128.

One type of custom data 154-3 is Hong Kong geographical data. For example, many locations in Hong Kong have both a Chinese name like "尖沙咀" and an English name like "Tsim Sha Tsui" that is a phonetic representation of the corresponding Chinese name. In this application, the phonetic representation of a Chinese phrase or character in Cantonese is also referred to as "Kongping." Because combinations like this one have been used for decades and are widely used among Cantonese speakers in Hong Kong, both the individual Kongpings and the Kongping combinations in the Hong Kong geographical data 154-3 are given added weight when generating the language-specific model file 128. Stated another way, the Kongping custom data is generally considered to be highly accurate for multi-character Chinese phrases, and in most cases Cantonese speakers also prefer the individual Kongpings in the custom data 154-3 even when the corresponding Chinese characters are used in other combinations. In some embodiments, the language model builder 152 often gives added weight to the custom data 154-3 when it is inconsistent with the user survey data 154-1 with respect to a particular Chinese phrase or character.

The third-party data may be obtained from documents accessible via the Internet. In some embodiments, a software application such as a classifier is configured to analyze web pages and look for (Chinese phrase, Kongping) pairs in tables or listings having recognized formats, for example:

陳大文 →Chan Dai Man
大昌行 →Dah Chong Hong

In some embodiments, the classifier first identifies a pattern of multiple (e.g., two to five) Chinese characters in proximity with multiple (e.g., two to five) Kongpings and then determines if there is a possible one-to-one mapping between a respective Chinese character and the corresponding Kongping by looking up the known Kongpings for the Chinese character in the language-specific (Cantonese) model file 128.

In other words, as shown in FIG. 2A, the construction of the model file can be an iterative process. The language model builder 152, periodically or otherwise, processes the newly-received data in any format from the data sources 154 and updates the Cantonese model file 128 accordingly.

Figure 2B:
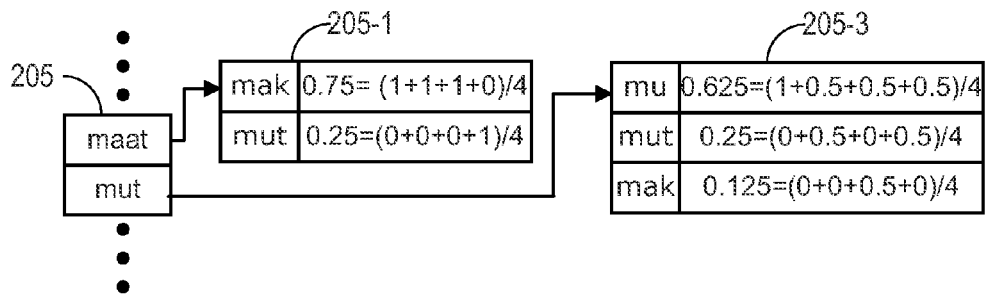
FIG. 2B depicts examples of automatically generating statistical models for user-provided Cantonese-phonetic representations of Chinese characters in accordance with some embodiments.
Figure 2B:
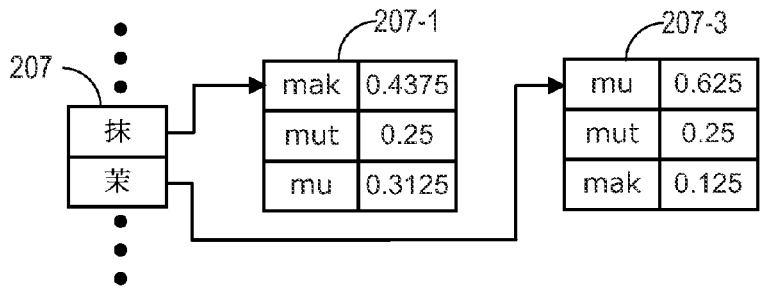

FIG. 2B depicts examples of automatically generated statistical models using user-provided Kongpings of Chinese characters in accordance with some embodiments. The user survey data 201 includes Kongpings from four users for the two Chinese characters "抹" and "茉" that appear in three Chinese phrases "抹(maat)布," "抹(mut)殺," and "茉(mut)莉". For clarity, each of the two characters is associated with its corresponding Jyutping, i.e., "maat" or "mut." Jyutping is a romanization scheme developed by the Linguistic Society of Hong Kong (LSHK) and it is rarely known or used among Cantonese speakers. Two important phenomena of Chinese can be found in these two characters and three phrases. First, the same character "抹" may have different pronunciations in different contexts such as "maat" for "抹布" and "mut" for "抹布." Second, different characters "抹" and "茉" may have the same pronunciation "mut."

Let

K(user, jp, kp) be the number of times that a user enters the Kongping kp for the Jyutping jp; and T(user, jp) be the total number of times that the user enters any Kongping for jp.

F(user, jp, kp), which is the user's frequency of using kp for jp, can be defined as:

$$F(\text{user},jp,kp)=K(\text{user},jp,kp)/T(\text{user},jp).$$

Using the formula above, the user survey data 201 is converted into the frequency data 203 shown in FIG. 2B. Note that the last two rows of the user survey data 201 are collapsed into the last row of the frequency data 203. Because the model file 128 represents a statistical model corresponding to a community of Cantonese-speaking users, the frequency data 203 can be summed over different users to arrive at a relationship between a jp and a kp as follows:

$$G(jp,kp)=[F(\text{user}1,jp,kp)+F(\text{user}2,jp,kp)+\ldots+F(\text{user}N,jp,kp)]/N.$$

In other words, G(jp, kp) indicates the popularity of a particular Kongping kp when the corresponding Jyutping is jp. As shown in FIG. 2B, table 205 has two Jyutping entries, one for "maat" and the other one for "mut." Each of the two entries points to a respective list 205-1, 205-3 of Kongping entries and their associated popularity scores.

Finally, H(C, kp), i.e., the popularity score of Kongping kp for a Chinese character C, is defined as follows:

$$H(C,kp)=w_1G(jp_1,kp)+w_2G(jp_2,kp)+\ldots w_MG(jp_M,kp),$$

wherein:

$jp_1, jp_2, \ldots, jp_M$, are the Jyutpings of the Character C; and
$w_1, w_2, \ldots, w_M$ are the weights allocated for the respective Jyutpings of the Character C.

As shown in FIG. 2B, table 207 has two entries, one for "抹" and the other one for "茉." Each of the two entries points to a respective list 207-1, 207-3 of Kongping entries and their associated popularity scores. For simplicity, all the weights $w_i$ are set to a value of 1/M in this example. In some embodiments, the H-values of different Kongpings kp for a particular Chinese character C are normalized such that the sum of the normalized popularity scores equals to a predefined constant (e.g., 100, or 1).

Figure 2C:
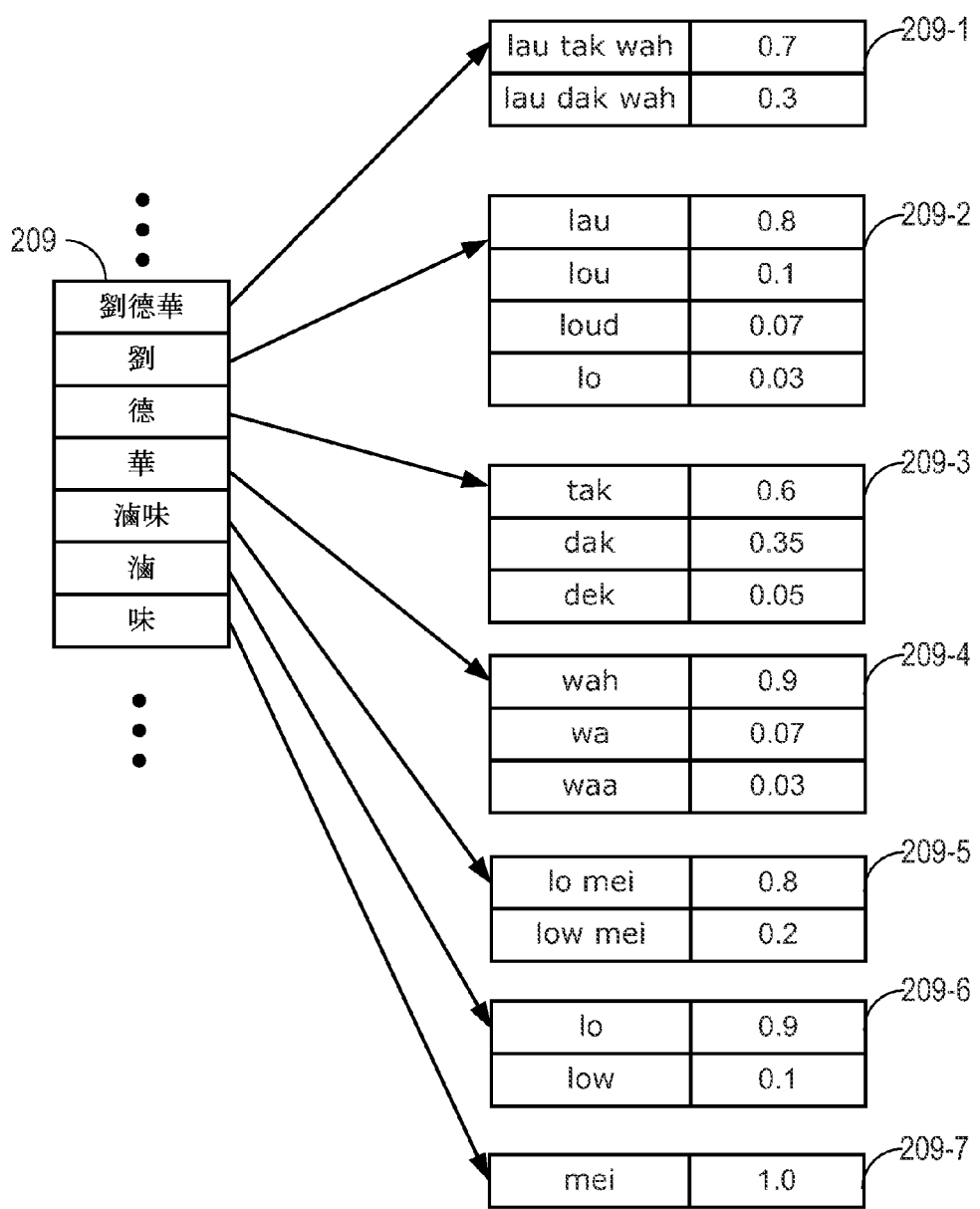
FIG. 2C is a block diagram of an exemplary data structure mapping Chinese phrases and characters to their corresponding Cantonese-based phonetic representation statistical models in accordance with some embodiments.

FIG. 2C is a block diagram of an exemplary data structure mapping Chinese phrases and characters to their corresponding Kongpings in accordance with some embodiments. This mapping is implemented as a lookup table 209 keyed by the Chinese phrases or characters whose values are lists (209-1 to 209-7) of (Kongping, popularity_score) pairs.

In some embodiments, the language model builder 152 builds each entry in the data structure by merging different types of data from various sources. Each type of data i is given a respective weight $r_i$ based on the authenticity of the corresponding data source. For example, the custom data 154-3 is generally given a higher weight than the user survey data 154-1 and the 3rd-party data 154-5 if it is derived from a long-established data source such as Hong Kong map data.

Let $H_i$(C, kp) be the popularity score of a particular Kongping kp of a Chinese phrase/character C from the data source i; and $H_i$(C) be the sum of the popularity scores of different Kongpings of the Chinese phrase/character C from the data source i.

The overall popularity score of the Kongping kp associated with the Chinese phrase/character C is defined as follows:

$$P(C,kp)=(r_1H_1(C,kp)+r_2H_2(C,kp)+\ldots+r_nH_n(C,kp))/(r_1H_1(C)+r_2H_2(C)+\ldots+r_nH_n(C)).$$

The Cantonese model builder 152 populates the data structure of the language-specific model file 128 with the overall popularity scores determined using the formula above. For each query identified in the query log 124, 126, the ordered set builder 142 generates a set of candidate Kongping prefixes by looking up entries in the model file 128.

In some embodiments, the model file 128 stores entries for individual Chinese characters like "抹布," "德," and "華" as well as entries for Chinese phrases like "劉德華." By doing so, the model file 128 can provide more context-dependent information with regard to the Kongping of a particular Chinese character. As noted above, one Chinese character may have different pronunciations in different phrases. Having an entry corresponding to a Chinese phrase and its Kongping popularity score distribution in the model file 128 makes it easier to associate a less popular Kongping with a character when the character is part of a special phrase. In some embodiments, the resulting model file 128 is stored in a compressed format to save storage space.

In some embodiments, using the model file 128 and the query logs 124, 126, the ordered set builder 142 constructs one or more query completion tables 130. As further illustrated below, the one or more query completion tables 130 are used by the prediction server 112 for generating predictions for a partial query. Each entry in the query completion tables 130 stores a query string and additional information. The additional information includes a ranking score, which may be based on the query's frequency in the query logs, date/time values of when the query was submitted by users in a community of users, and/or other factors. The additional information for the query optionally includes a value indicating the language of the complete query. Each entry in a respective query completion table 130 represents a predicted complete query associated with a partial query. Furthermore, in some embodiments a group of predicted complete queries associated with the same prefix are stored in a query completion table 130 sorted by frequency or ranking score. Optionally, the query completion tables 130 are indexed by the query fingerprints of corresponding partial search queries, where the query fingerprint of each partial query is generated by applying a hash function (or other fingerprint function) to the partial query. In some embodiments, the predicted complete queries are stored in the one or more query completion tables 130 in their original languages (e.g., Chinese and English).

Figure 3A:
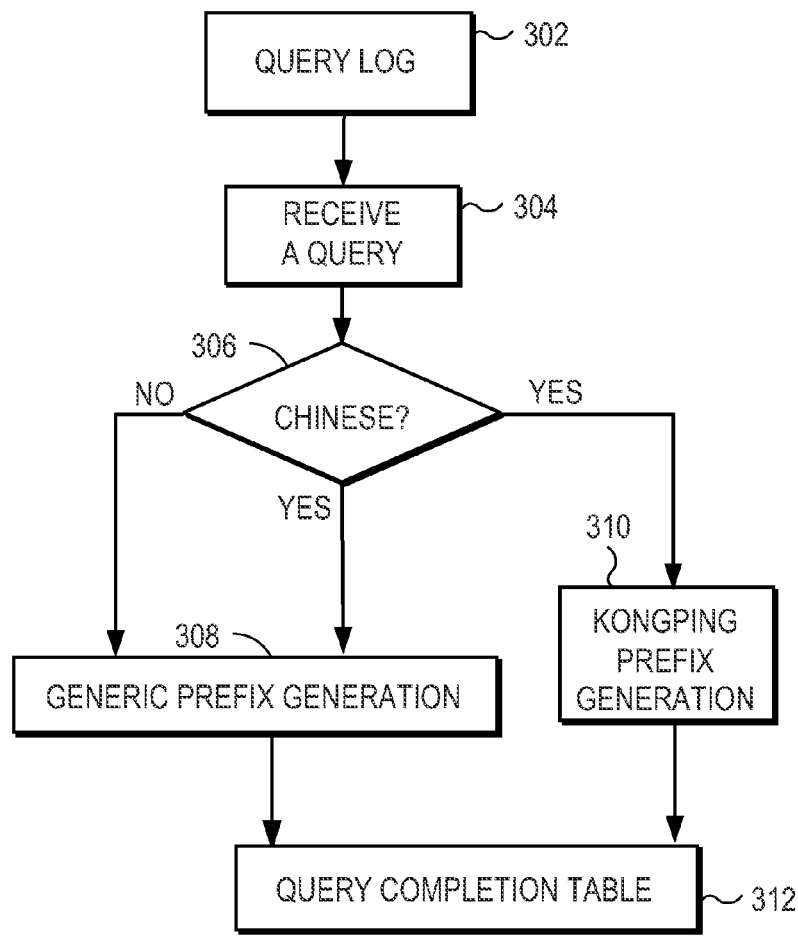
FIGS. 3A to 3C are flowcharts of a method of generating one or more query completion tables for Cantonese-phonetic representations of Chinese characters in accordance with some embodiments.

FIG. 3A is an overview flowchart of a method of generating one or more query completion tables for the Kongpings of Chinese characters in accordance with some embodiments. Initially, the ordered set builder 142 retrieves a query 304 from a query log 302. In some embodiments, the query log 302 stores historical query information associated with a particular geographical region (e.g., Hong Kong). In some other embodiments, the query log 302 stores global historical query information. The ordered set builder 142 checks whether the query is in Chinese or not (306). If it is not in Chinese (306, No), the ordered set builder 142 generates generic prefix entries for the query (308). If the query is in Chinese (306, Yes), the ordered set builder 142 generates both generic prefix entries (308) and the Kongping prefix entries for the query (310). Finally, the ordered set builder 142 inserts the generated generic and/or Kongping prefix entries into the query completion tables (312).

Figure 3B:
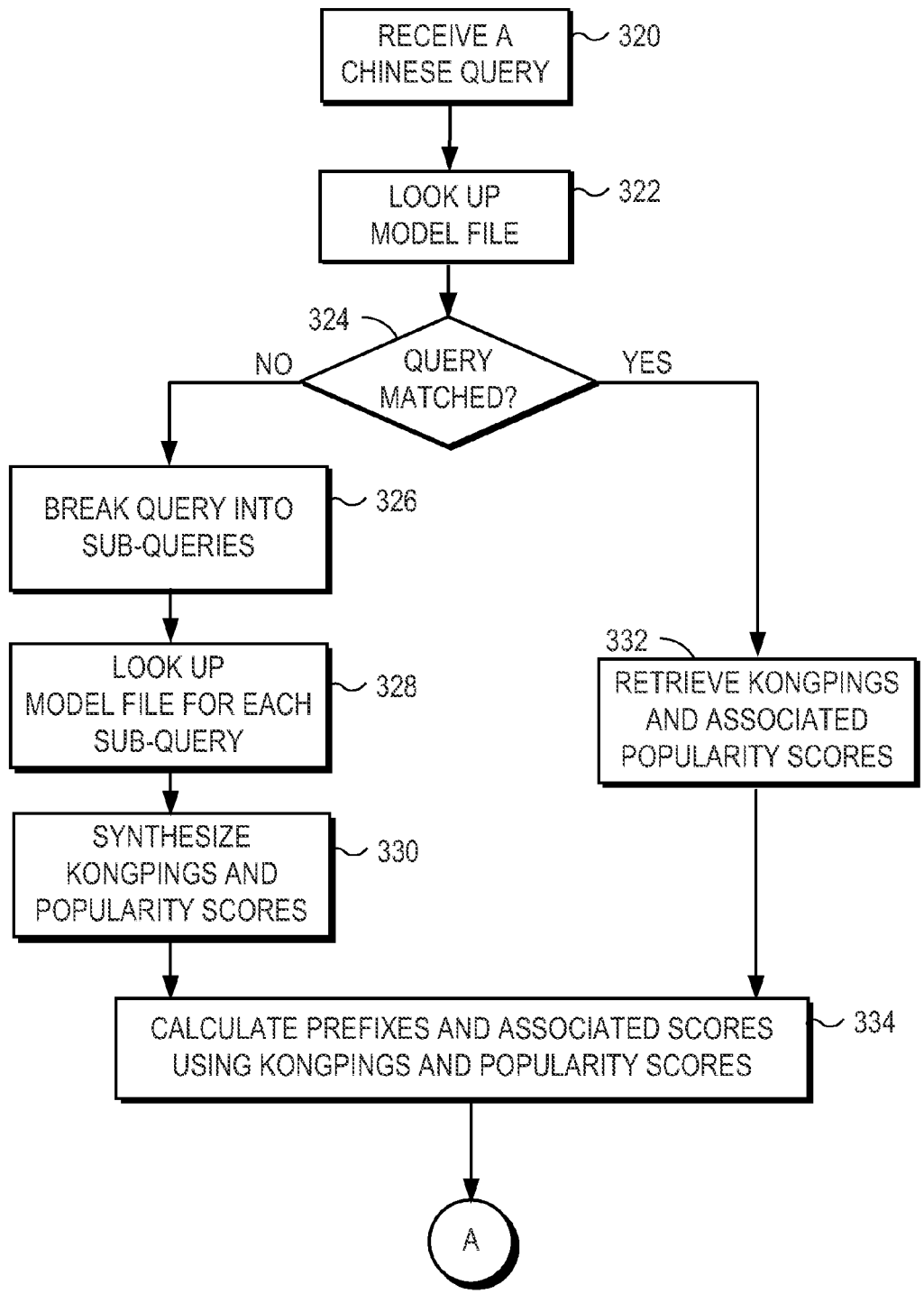
Figure 3C:
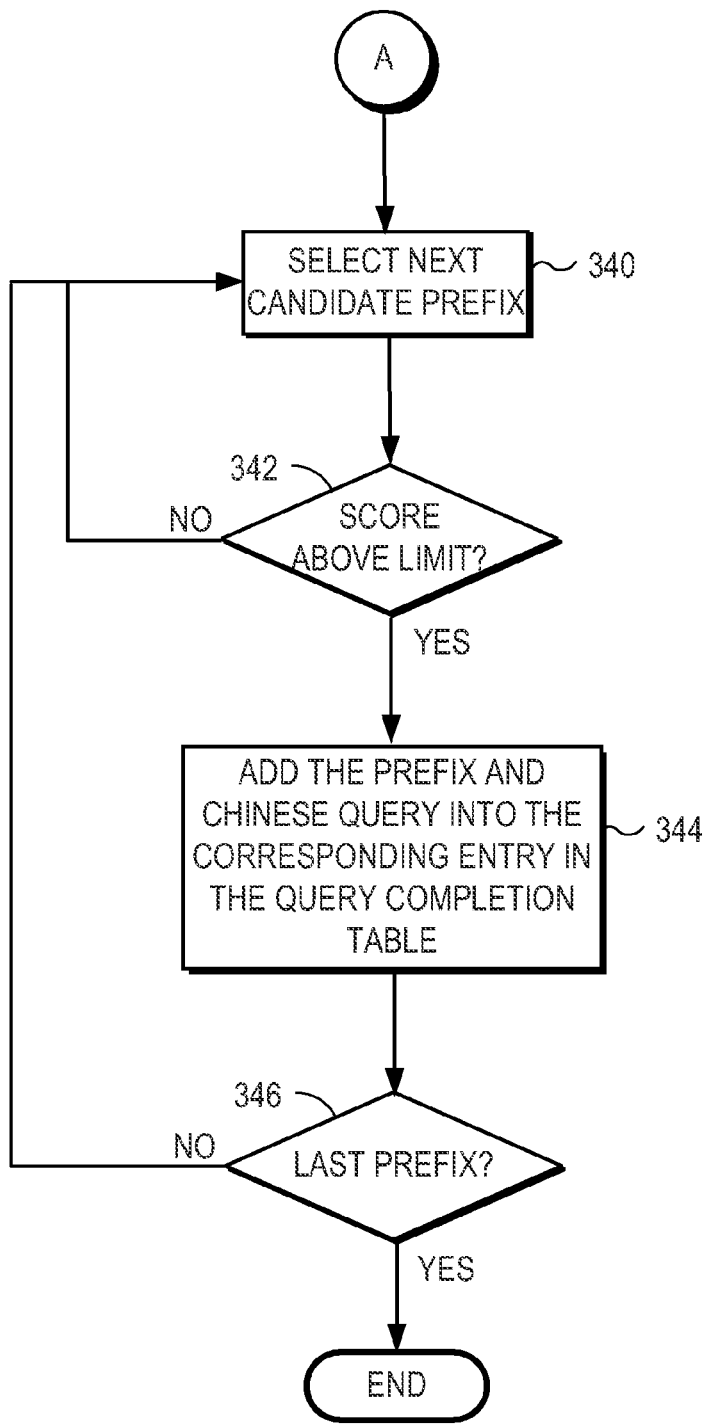
Figure 3D:
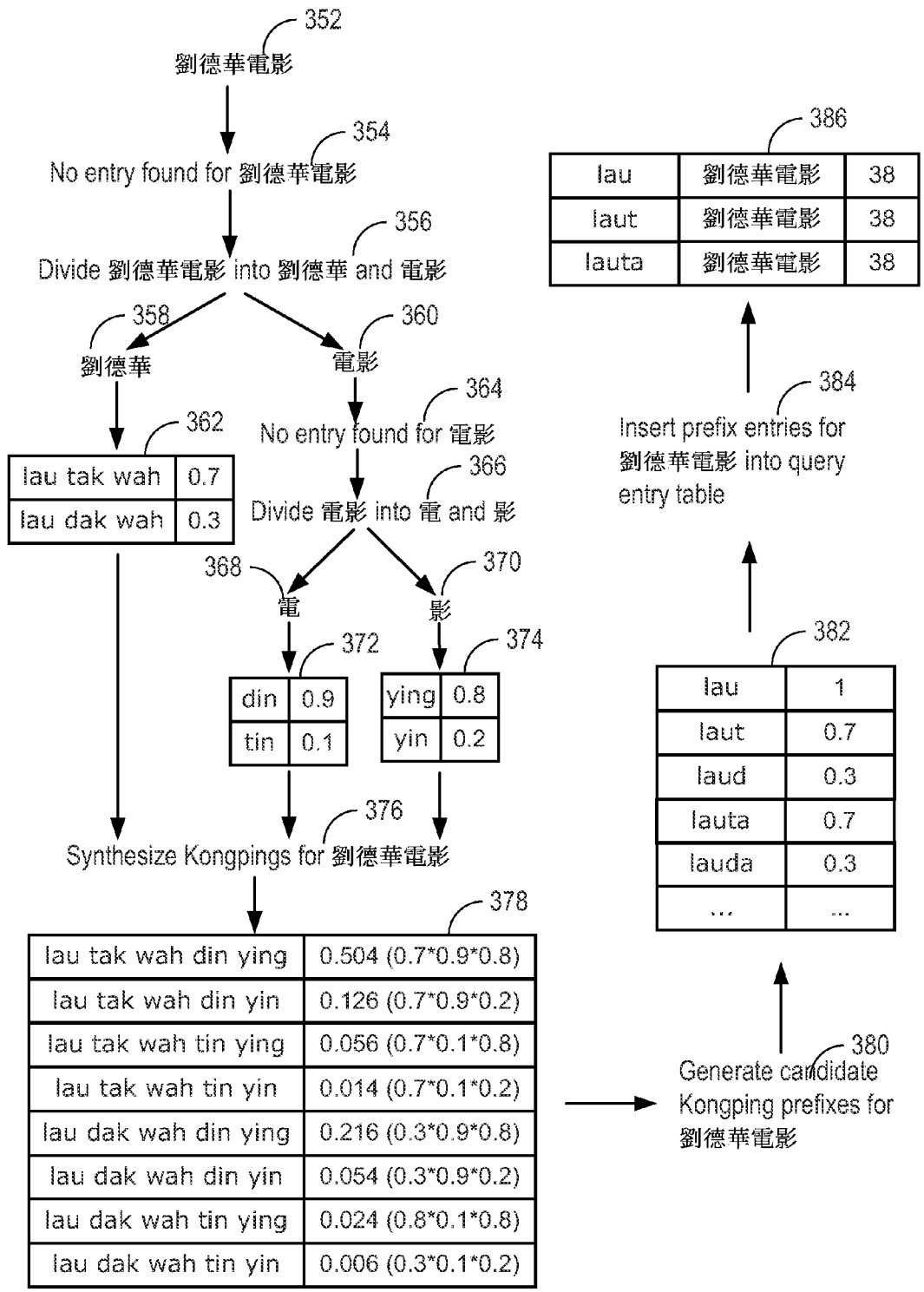
FIG. 3D depicts examples of a process of synthesizing Kongpings and associated popularity scores and generating candidate Kongping prefixes accordingly in accordance with some embodiments.

FIGS. 3B and 3C are flowcharts illustrating further details of how the ordered set builder 142 generates the Kongping prefix entries for a Chinese query in accordance with some embodiments. Upon receipt of a Chinese query (320), the ordered set builder 142 performs a lookup of the model file 128 (322) to determine whether the model file 128 includes an entry corresponding to the query (324). If a corresponding entry is found in the model file 128 (324—yes), the process retrieves from the model file the Kongpings for the Chinese query and their associated popularity scores from the model file (332). For example, if the Chinese query is "劉德華," the ordered set builder 142 identifies a corresponding entry in the model file 128 (e.g., table 209-1 in FIG. 2C) and retrieves the Kongpings and their associated popularity scores from the model file (332). Otherwise (324—no), the ordered set builder 142 synthesizes (330) the Kongpings and popularity scores for the query by breaking the query into multiple sub-queries (326) and performing a lookup in the model file for each sub-query (328). In some embodiments, as illustrated in FIG. 3D, the ordered set builder 142 performs this query subdivision and table lookup recursively until identifying an entry in the model file 128 for each component of the query. Using the identified/synthesized Kongpings and their associated popularity scores, the ordered set builder 142 calculates a set of candidate prefixes for the query and their respective popularity scores (334). For each candidate prefix (340), the ordered set builder 142 determines whether its popularity score is above a predefined limit or not (342). If the popularity score is not above the predefined limit (342, no), the ordered set builder 142 proceeds to process the next candidate prefix (if any) in the set (340). If the popularity score is above the predefined limit (342, yes), the ordered set builder 142 then adds the candidate prefix and information about the query such as its ranking score into the query completion table 130 (344). Next, the ordered set builder 142 determines if this is the last candidate prefix in set (346). If the current candidate prefix is not the last one in the set (346, no), the ordered set builder 142 proceeds to process the next candidate prefix in the set (340). Otherwise, the process for the set of candidate prefixes is completed. Note that operations 340, 342, 344 and 346 (where applicable) are repeated for each candidate prefix.

As noted above, for a given Chinese query the model file 128 may not have any corresponding Kongping. In this case, the ordered set builder 142 has to synthesize one or more Kongpings for the query. FIG. 3D depicts an exemplary process of how the ordered set builder 142 synthesizes Kongpings, generates a set of candidate Kongping prefixes, and then populates the query completion table accordingly for a complete Chinese query "劉德華 電影" (352). As shown in FIG. 3D, there is no entry corresponding to "劉德華電影" in the model file 128 (354). Thus, the ordered set builder 142 divides the query into two sub-queries, "劉德華" and "電影" (356). In some embodiments, the ordered set builder 142 first drops the last character "影" from the query and checks if the remaining portion of the query "劉德華電" has a matching entry in the model file or not. The ordered set builder 142 performs this query subdivision recursively until an entry matching "劉德華" is found in the model file (358). In this case, the ordered set builder 142 retrieves a list of Kongping 362 for "劉德華" and performs the same process for the remaining portion of the query "電影" (364). Assuming that no entry is found in the model file for "電影" (364), the ordered set builder 142 divides "電影" into two individual characters (366). For each character, the ordered set builder 142 retrieves a list of Kongpings 372 and 374, respectively.

Using the three lists of Kongpings, the ordered set builder 142 synthesizes the Kongpings for the entire query "劉德華電影" (376).

In some embodiments, the ordered set builder 142 performs the synthesis by multiplying the popularity scores of the respective sub-queries that together form the complete query 352. Because each of the three sub-queries has two Kongpings, eight synthesized Kongpings are generated (378). Next, the ordered set builder 142 generates candidate Kongping prefixes for the query "劉德華電影" using the eight synthesized Kongpings and their associated popularity scores (380). For a particular language such as Cantonese, the ordered set builder 142 defines minimum and maximum length limits for the prefix. In some embodiments, these parameters are user-configurable. The minimum length limit is typically 2 or 3 characters, but may be set as low as 1 in some embodiments. The maximum length limit is typically 15 to 20 characters, but there is no reason other than cost that the maximum length limit cannot be significantly larger than 20 characters. In some embodiments, the ordered set builder 142 first concatenates the Kongpings into a single string by removing the delimiters, e.g., "lau tak wah din ying" into "lautakwandinying." Assuming that the minimum and maximum length limits are 3 to 5 characters, the ordered set builder 142 calculates the sum of the popularity scores of all the eight Kongpings for the candidate prefix "lau" (i.e., 1) and then the sum of the popularity scores of the first four Kongpings for the candidate prefix "laut" (i.e., 0.7), etc. Next, the ordered set builder 142 filters out those the candidate prefixes whose popularity scores are below a predefined limit, e.g., 0.5 (382). As a result, only three prefixes, "lau," "laut," and "lauta," are kept. The ordered set builder 142 then inserts the three prefixes, the Chinese query "劉德華電影" and its associated ranking score 38 into the query completion table (386).

Note that each Chinese character has a specific pronunciation and therefore an associated phonetic representation (e.g., Pinyin in Mandarin and Kongping in Cantonese). A user who enters a query in Kongping may separate the Kongpings of different Chinese characters by a space " ", an underline "_", a hyphen "-", or other delimiter. So in some embodiments, besides the concatenated phonetic characters (e.g., Kongpings) shown in the table 382 of FIG. 3D (e.g., "laut") the ordered set builder 142 also inserts prefixes (e.g., "lau t") with predefined delimiters between the Kongpings of different Chinese characters into the query completion tables. Examples of Kongpings with inserted delimiters are "lau t" and "lau-t". In some embodiments, the concatenated prefixes and the prefixes having predefined delimiters are merged into the same entry in a query completion table. In some other embodiments, the concatenated prefixes and the prefixes having predefined delimiters are kept as separate entries in the query completion tables. In some embodiments, the ordered set builder 142 also inserts a prefix in the form of the initial characters of the corresponding Kongpings into the query completion tables. According to the table 378 of FIG. 3D, the five initial characters of "劉德華電影" may be "ltwdy," "ltwty," "ldwdy," or "ldwty." Therefore, the prefixes such as "ltw" or "ldwt" can be inserted into the query completion table corresponding to the Chinese query "劉德華電影." In some embodiments, the predicted complete queries (as represented by query completion table entries) for a concatenated prefix, a prefix counterpart having delimiters and a prefix comprising the initial characters of the corresponding Kongpings share the same popularity scores.

Figure 4A:
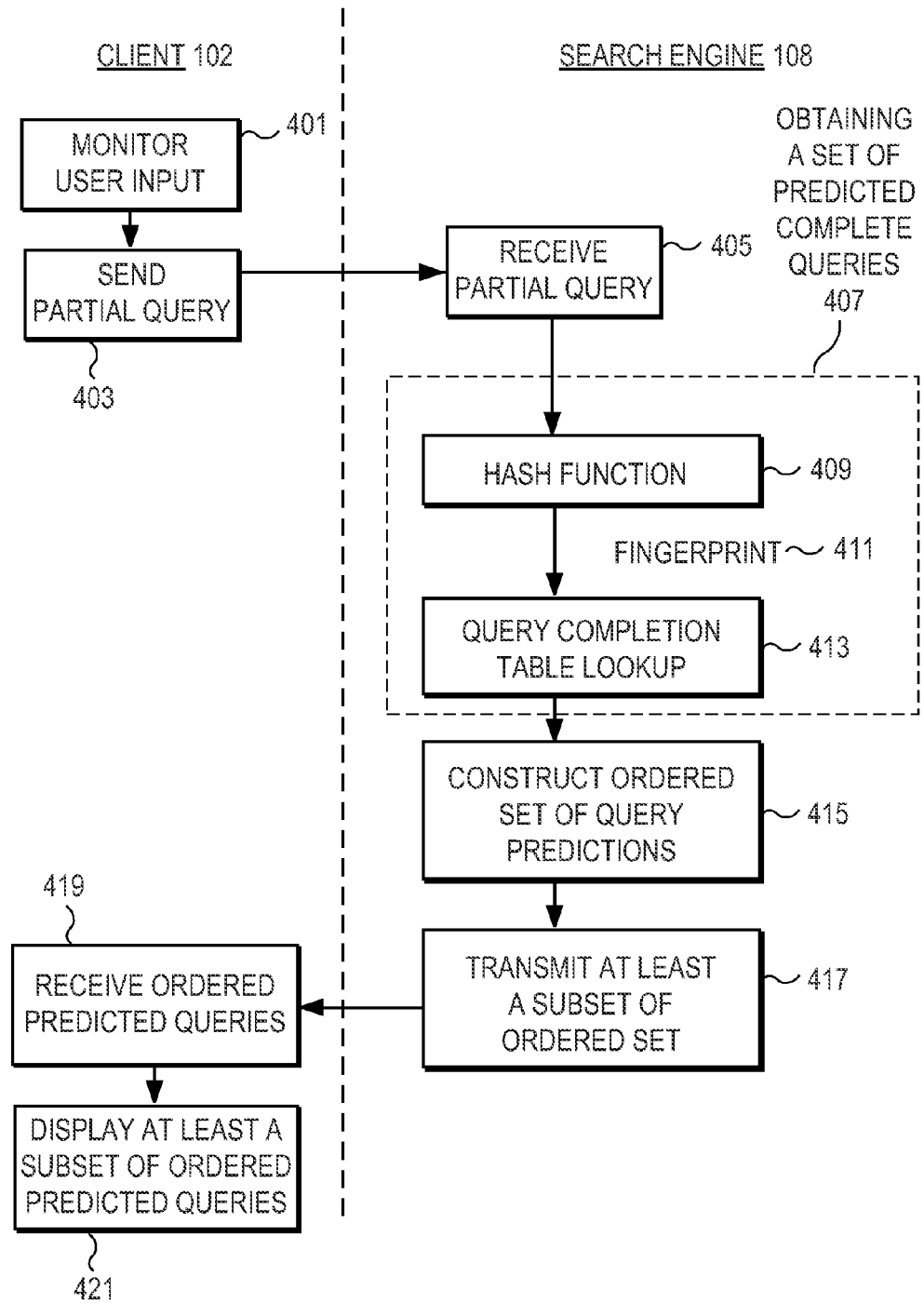
FIG. 4A is a flowchart of a method of processing of a partial query in accordance with some embodiments.

Referring to FIG. 4A, as a user enters a query, the user's input is monitored by the client system 102 (401). Prior to the user (sometimes called the requestor) signaling completion of the query, at least a portion of the user's query is sent from the client system 102 to the search engine 108 (403). The portion of the query may be a few characters, a query term, or more than one query term. In some embodiments, the partial query is entered as a string of Latin characters, which may be an English expression or Kongpings of Chinese characters.

The search engine 108 receives the partial query for processing (405) and proceeds to make predictions as to the user's contemplated complete query (407). First, the search engine 108 applies a hash function (or other fingerprint function) (409) to create a fingerprint 411 of the partial query. The search engine 108 performs a lookup operation (413) using the fingerprint 411 to locate a query completion table 130 that corresponds to the partial query. The lookup operation includes searching in the query completion table 130 for a fingerprint that matches the fingerprint 411 of the partial query. The query completion table 130 may include a plurality of entries that match or correspond to the partial query, and the fingerprint 411 is used to locate the first (or last) of those entries. The lookup operation (413) produces a set of predicted complete queries that correspond to the received partial query.

Each entry in the query completion table includes a predicted complete query and other information such as the frequency or ranking score for the predicted complete query. The search engine 108 uses the information to construct an ordered set of complete query predictions (415). In some embodiments, the set is ordered by frequency or ranking score. The search engine 108 then returns at least a subset of the predicted complete queries (417) to the client which receives the ordered predicted complete queries (419). The client proceeds to display at least a subset of the ordered predicted complete queries (421).

Note that the ordered set of predicted complete queries may include queries in multiple languages, since the partial query received at 405 can potentially match query entries in different languages in the query completion table 130 corresponding to the fingerprint 411. The search engine 108 can be configured to return mixed language predicted complete queries or can be configured to select whichever language is more likely to predict the partial query.

In some embodiments, either prior to ordering the predicted complete queries (415) or prior to conveying the predicted complete queries to the client (417), the set of predicted complete queries is filtered to remove queries, if any, matching one or more terms in one or more predefined sets of terms. For example, the one or more predefined sets of terms may include English terms and Cantonese terms that are considered to be objectionable, or culturally sensitive, or the like. The system performing the method may include, stored in memory, one or more tables (or other data structures) that identify the one or more predefined sets of terms. In some other embodiments, the set of predicted complete queries conveyed to the client (417) are filtered at the client by the client assistant 104 to remove queries, if any, matching one or more terms in one or more predefined sets of terms. Optionally, a plurality of different filters may be used for a plurality of different groups of users. In some embodiments, run time filtering (performed in response to a partial query) is used in place of filtering during the building of the query completion tables.

Figure 4B:
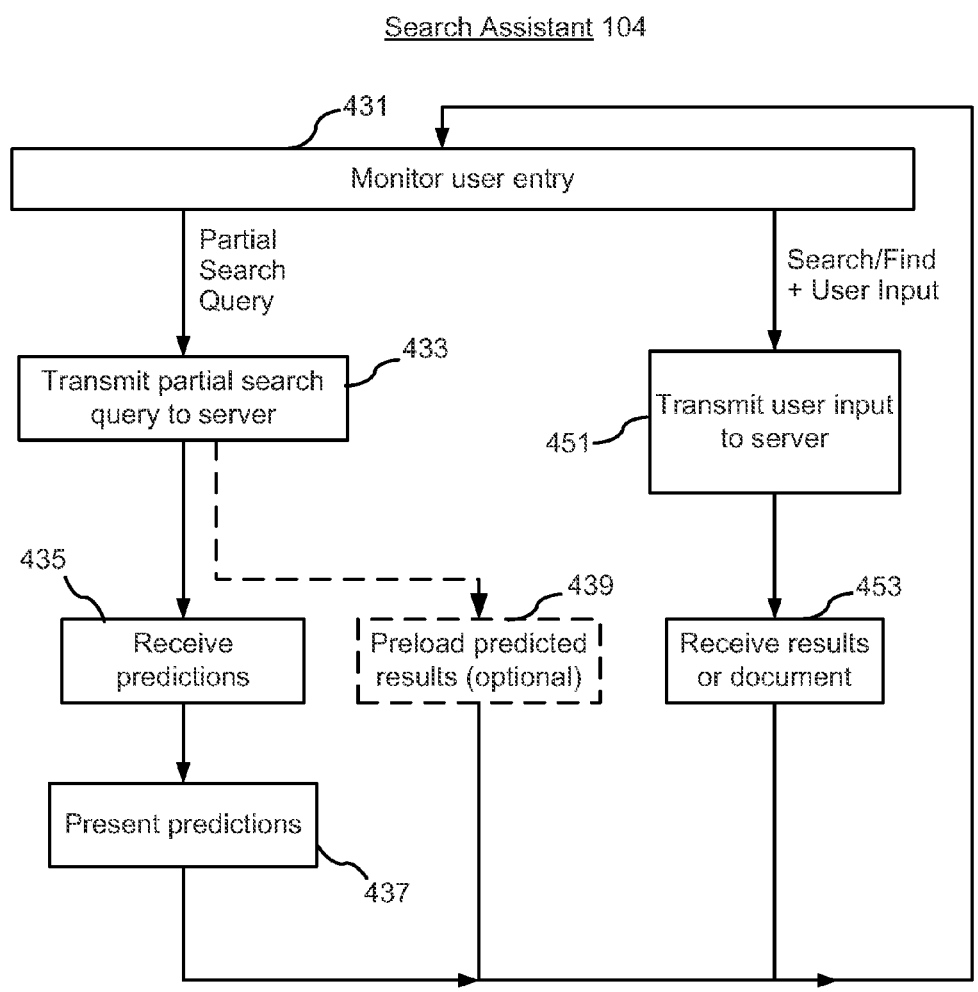
FIG. 4B is a flowchart of a process performed by a search assistant at a client system or device, in accordance with some embodiments.

FIG. 4B illustrates an embodiment that may be implemented in the client assistant 104 of a client system 102. A client assistant 104 monitors the user's entry of a query into a text entry box on a client system 102 (431). The user's entry may be one or more characters, or one or more words (e.g., the first word or two of a phrase, or a first word and the beginning character, characters or symbols of a new word of a phrase of a compound term). The client assistant 104 may identify two different types of queries. First, the client assistant 104 receives or identifies a partial query when an entry is identified prior to when the user indicates completion of the input string (as described below). Second, the client assistant 104 receives or identifies a user input when the user has selected a presented prediction, or indicated completion of the input string.

When a user input or selection is identified as a completed user input, the completed user input is transmitted to a server for processing (451). The server returns a set of search results, which is received by the client assistant 104 or by a client application, such as a browser application (453). In some embodiments, the browser application displays at least part of the search results in a web page. In some other embodiments, the client assistant 104 displays the search results. Alternately, the transmission of a completed user input (451) and the receipt (453) of search results may be performed by a mechanism other than the client assistant 104. For example, these operations may be performed by a browser application using standard request and response protocols (e.g., HTTP).

A user input may be identified by the client assistant 104 (or by a browser or other application) as a completed user input, in a number of ways such as when the user enters a carriage return, or equivalent character, selects a "find" or "search" button in a graphical user interface (GUI) presented to the user during entry of the query, or by selecting one of a set of predicted queries presented to the user during entry of the query. One of ordinary skill in the art will recognize a number of ways to signal the final entry of the query.

Prior to the user signaling a completed user input, a partial query may be identified. For example, a partial query is identified by detecting entry or deletion of characters in a text entry box. Once a partial query is identified, the partial query is transmitted to the server (433). In response to the partial query, the server returns predictions, including predicted complete search queries. The client assistant 104 receives (435) and presents (e.g., displays, verbalizes, etc.) at least a subset of the predictions (437).

After the predicted complete queries are presented to the user (437), the user may select one of the predicted complete search queries if the user determines that one of the predicted complete queries matches the user-intended entry. In some instances, the predictions may provide the user with additional information that had not been considered. For example, a user may have one query in mind as part of a search strategy, but seeing the predicted complete queries causes the user to alter the input strategy. Once the set is presented (437), the user's input is again monitored (431). If the user selects one of the predictions, the user input is transmitted to the server (451) as a complete query (also herein called a completed user input). After the request is transmitted, the user's input activities are again monitored (431).

In some embodiments, the client assistant 104 may preload additional predicted results (each of which is a set of predicted complete queries) from the server (439). The preloaded predicted results may be used to improve the speed of response to user entries. For example, when the user enters <ban>, the client assistant 104 may preload the prediction results for <bana>, . . . , and <bank>, in addition to the prediction results for <ban>. If the user enters one more character, for example <k>, to make the (partial query) entry <bank>, the prediction results for <bank> can be displayed without transmitting (433) the partial query to the server and receiving (435) predictions.

In some embodiments, one or more sets of predicted results are cached locally at the client. When the user modifies the current query to reflect an earlier partial input (e.g., by backspacing to remove some characters), the set of predicted results associated with the earlier partial input is retrieved from the client cache and again presented again to the user instead of the partial input being sent to the server.

In some embodiments, after receiving the search results or document for a final input (453), or after displaying the predicted complete search queries (437), and optionally preloading predicted results (439), the client assistant 104 continues to monitor the user entry (431) until the user terminates the client assistant 104, for example, by closing a web page that contains the client assistant 104. In some other embodiments, the client assistant 104 continues to monitor the user entry (431) only when a text entry box (discussed below with reference to FIG. 7A) is activated and suspends the monitoring when the text entry box is deactivated. In some embodiments, a text entry box in a user interface is activated when it is displayed in a currently active window or toolbar of a browser application, and is deactivated when either the text entry box is not displayed or the text entry box is not in an active window or toolbar of the browser application.

Figure 4C:
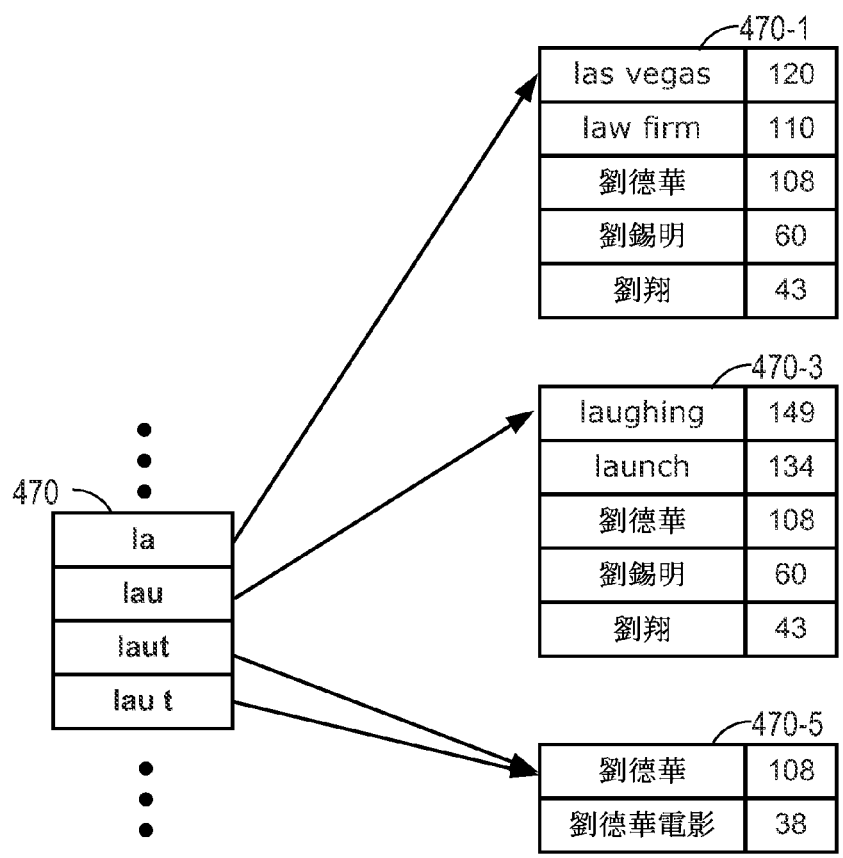
FIG. 4C is a block diagram of an exemplary data structure mapping partial queries of Latin characters to predicted complete queries in one or more languages in accordance with some embodiments.

Referring to FIG. 4C, an exemplary data structure of the query completion table 130 includes a list of partial query entries 470. In some embodiments, the partial query entries are encoded into fingerprints using many known schemes. The partial query may be part of an English phrase or Kongping of a Chinese phrase or character. Each partial query entry points to a list of predicted complete queries (470-1 to 470-5). For example, the list 470-1 of predicted complete queries includes both English queries (e.g., "las vegas" and "law firm") and Chinese queries (e.g., "劉德華" and "劉錫明"). Each complete query has an associated ranking score (e.g., 120 for "las vegas" and 108 for "劉德華").

In some embodiments, a search engine 108 may receive queries in one language (e.g., English) at a much higher submission frequency than queries in other languages (e.g., Chinese). As a result, certain Chinese queries like "劉德華," although very popular among a particular community of users (e.g., people in Hong Kong), have a far lower ranking score than many English queries that match the partial query "la." Thus, in some embodiments, the ranking scores of the queries in different languages are adjusted by increasing the ranking scores of those queries written in a local language used by the community of users or decreasing the ranking scores of those queries written in other languages and rarely used by the community of users. By doing so, Chinese queries like "劉德華" may appear at or near the top of a list of predicted complete queries.

Figure 4D:
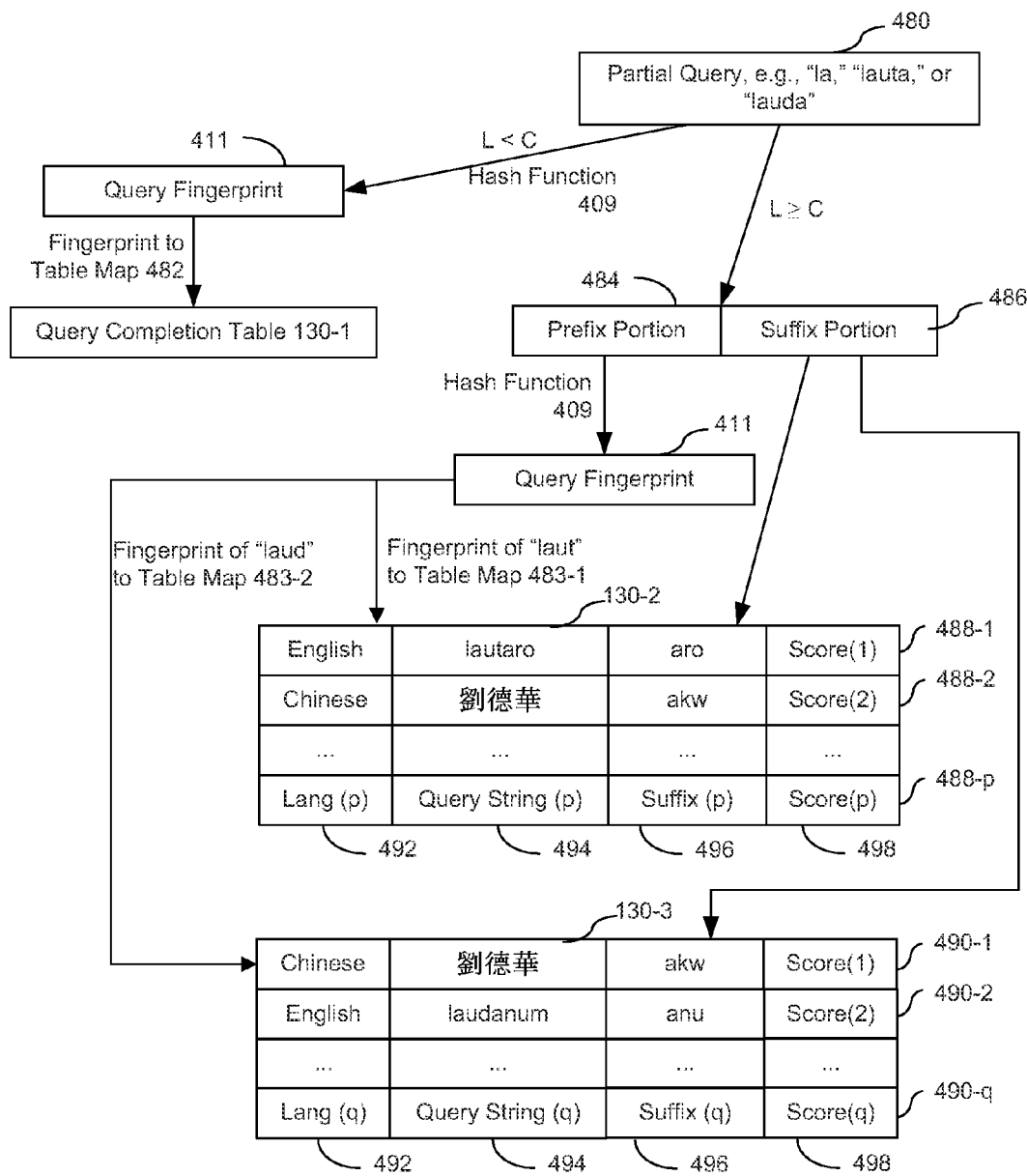
FIG. 4D is a block diagram schematically illustrating the process used both for generating query completion tables as well as for lookup when processing a user entered partial query in accordance with some embodiments.

FIG. 4D is a block diagram schematically illustrating the process used both for generating query completion tables as well as for lookup when processing a user entered partial query. When the length of the partial query (e.g., "la") is less than the size of one "chunk", C (e.g., 4), the entire partial query is mapped to a query fingerprint 411, for example by using a hash function (or other fingerprint function) 409 (FIG. 4A). The fingerprint 411 is mapped to a query completion table 130-1 by a fingerprint to table map 482.

When the length of the partial query is at least the size of one chunk, C, the partial query (e.g., "lauta" or "lauda") is decomposed into a prefix 484 and a suffix 486, whose lengths are governed by the chunk size. A fingerprint is generated for the prefix 484, for example by applying a hash function 409 to the prefix 484, and that fingerprint is then mapped to a respective "chunked" query completion table 130-2 or 130-3 by a fingerprint to table map 483-1 or 483-2. In some embodiments, each chunked query completion table 130-2 or 130-3 is a set of entries in a bigger query completion table, while in other embodiments each chunked query completion table is a separate data structure. Each entry 488-$p$ or 490-$q$ of a respective query completion table includes a query string 494, which is the text of a complete query in a corresponding language, and may optionally include a popularity score 498 as well, used for ordering the entries in the query completion table. Each entry of a chunked query completion table includes the suffix of a corresponding partial query. The suffix 496 in a respective entry has a length, S, which can be anywhere from zero to C−1, and comprises the zero or more characters of the partial query that are not included in the prefix 484. In some embodiments, when generating the query completion table entries for a historical query, only one entry is made in a respective chunked query completion table 130 that corresponds to the historical query. In particular, that one entry contains the longest possible suffix for the historical query, up to C−1 characters long. In other embodiments, up to C entries are made in each chunked query completion table 130 for a particular historical query, one for each distinct suffix.

Optionally, each entry in a respective query completion table 130 includes a language value or indicator 492, indicating the language associated with the complete query. However, a language value 492 may be omitted in embodiments in which all the query strings are stored in the query completion tables 130 in their original language.

As shown in FIG. 4D, the same Chinese query "劉德華" has one entry 488-2 in the query completion table 130-2 and one entry 490-2 in the query completion table 130-3. The entry 488-2 corresponds to the Kongping "lau tak wah" and the entry 490-2 corresponds to the Kongping "lau dak wah." Thus, the two partial queries "lauta" and "lauda" are mapped to the two different query completion tables 130-2 and 130-3, respectively. The suffix portion of the two partial queries, "a," matches multiple entries in the respective query completion table. In some embodiments, the prediction server 112 identifies the matched complete queries in the respective query completion tables and orders them by their respective popularity scores until a predefined number of complete queries are found. At least a subset of these identified complete queries are sent to a respective client 102 as suggested queries for the user to choose.

In some embodiments, the search engine 108 maintains multiple copies of a partial query in Kongping in the query completion tables, some without the space delimiter " " and others with the delimiter. In some embodiments, the different copies of the same partial query point to the same list of predicted complete queries (e.g., 470-5). In some other embodiments, the different copies are treated as different partial queries and each one has its own list of predicted complete queries.

Figure 5:
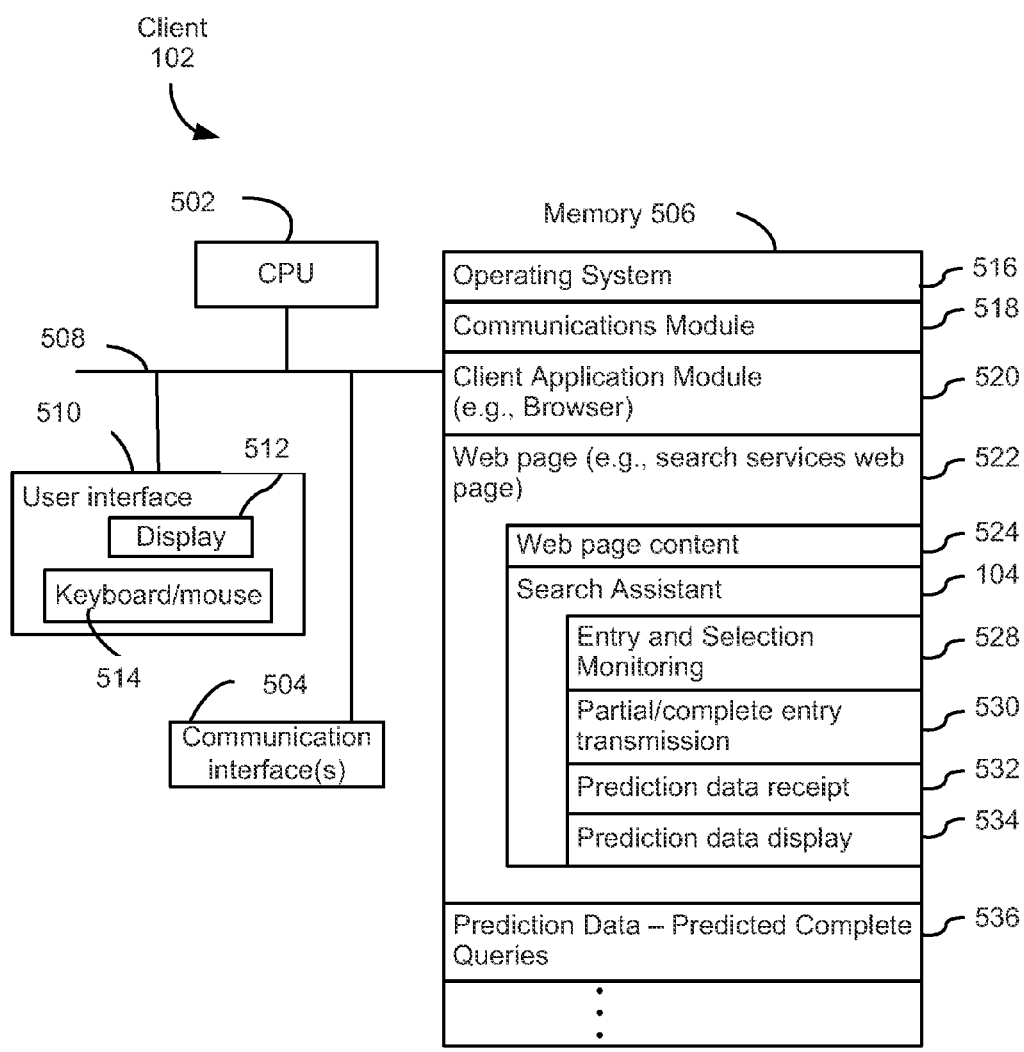
FIG. 5 is a block diagram of a client system in accordance with some embodiments.

Referring to FIG. 5, an embodiment of a client system 102 that implements the methods described above includes one or more processing units (CPU's) 502, one or more network or other communications interfaces 504, memory 506, and one or more communication buses 508 for interconnecting these components. In some embodiments, fewer and/or additional components, modules or functions are included in the client system 102. The communication buses 508 may include circuitry (sometimes called a chipset) that interconnects and controls communications between system components. The client 102 may optionally include a user interface 510. In some embodiments, the user interface 510 includes a display device 512 and/or a keyboard 514, but other configurations of user interface devices may be used as well. Memory 506 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 506 may optionally include mass storage that is remotely located from CPU's 502. Memory 506, or alternately the non-volatile memory device(s) within memory 506, comprises a computer readable storage medium. Memory 506 or the computer readable storage medium of memory 506 stores the following elements, or a subset of these elements, and may also include additional elements:

- an operating system 516 that includes procedures for handling various basic system services and for performing hardware dependent tasks;
- a network communication module (or instructions) 518 that is used for connecting the client system 102 to other computers via the one or more communications network interfaces 504 and one or more communications networks, such as the Internet, other wide area networks, local area networks, metropolitan area networks, and so on;
- a client application 520 (e.g., an Internet browser application); the client application may include instructions for interfacing with a user to receive search queries, submitting the search queries to a server or online service, and for displaying or otherwise presenting search results;
- a web page 522, which includes web page content 524 to be displayed or otherwise presented on the client 102; the web page in conjunction with the client application 520 implements a graphical user interface for presenting web page content 524 and for interacting with a user of the client 102;
- data 536 including predicted complete search queries; and
- a client assistant 104, which in some embodiments is embedded in the web page 522.

At a minimum, the client assistant 104 transmits partial query information to a server. The search assistant may also enable the display of prediction data including the predicted complete queries, and user selection of a displayed predicted complete query. In some embodiments, the client assistant 104 includes the following elements, or a subset of such elements:

- an entry and selection monitoring module (or instructions) 528 for monitoring the entry of search queries and selecting partial search queries for transmission to the server;
- a partial/complete entry transmission module (or instructions) 530 for transmitting partial search queries and (optionally) completed search queries to the server;
- a prediction data receipt module (or instructions) 532 for receiving predicted complete queries; and
- prediction data display module (or instructions) 534 for displaying at least a subset of predicted complete queries and any additional information.

The transmission of final (i.e., completed) queries, receiving search results for completed queries, and displaying such results may be handled by the client application/browser 520, the client assistant 104, or a combination thereof. The client assistant 104 can be implemented in many ways.

In some embodiments, a web page (or web pages) 522 used for entry of a query and for presenting responses to the query also includes JavaScript or other embedded code, for example a Macromedia Flash object or a Microsoft Silverlight object (both of which work with respective browser plug-ins), or instructions to facilitate transmission of partial search queries to a server, for receiving and displaying predicted search queries, and for responding to user selection of any of the predicted search queries. In particular, in some embodiments the client assistant 104 is embedded in the web page 522, for example as an executable function, implemented using JavaScript (trademark of Sun Microsystems) or other instructions executable by the client 102. Alternately, the client assistant 104 is implemented as part of the client application 520, or as an extension, plug-in or toolbar of the client application 520 that is executed by the client 102 in conjunction with the client application 520. In yet other embodiments, the client assistant 104 is implemented as a program that is separate from the client application 520.

In some embodiments, a system for processing query information includes one or more central processing units for executing programs and memory to store data and to store programs to be executed by the one or more central processing units. The memory stores a set of complete queries previously submitted by a community of users, ordered in accordance with a ranking function, the set corresponding to a partial query and including both English language and Chinese language complete search queries as well as queries in other languages. The memory further stores a receiving module for receiving the partial query from a search requestor, a prediction module for associating the set of predicted complete queries to the partial query, and a transmission module for transmitting at least a portion of the set to the search requestor.

Figure 6:
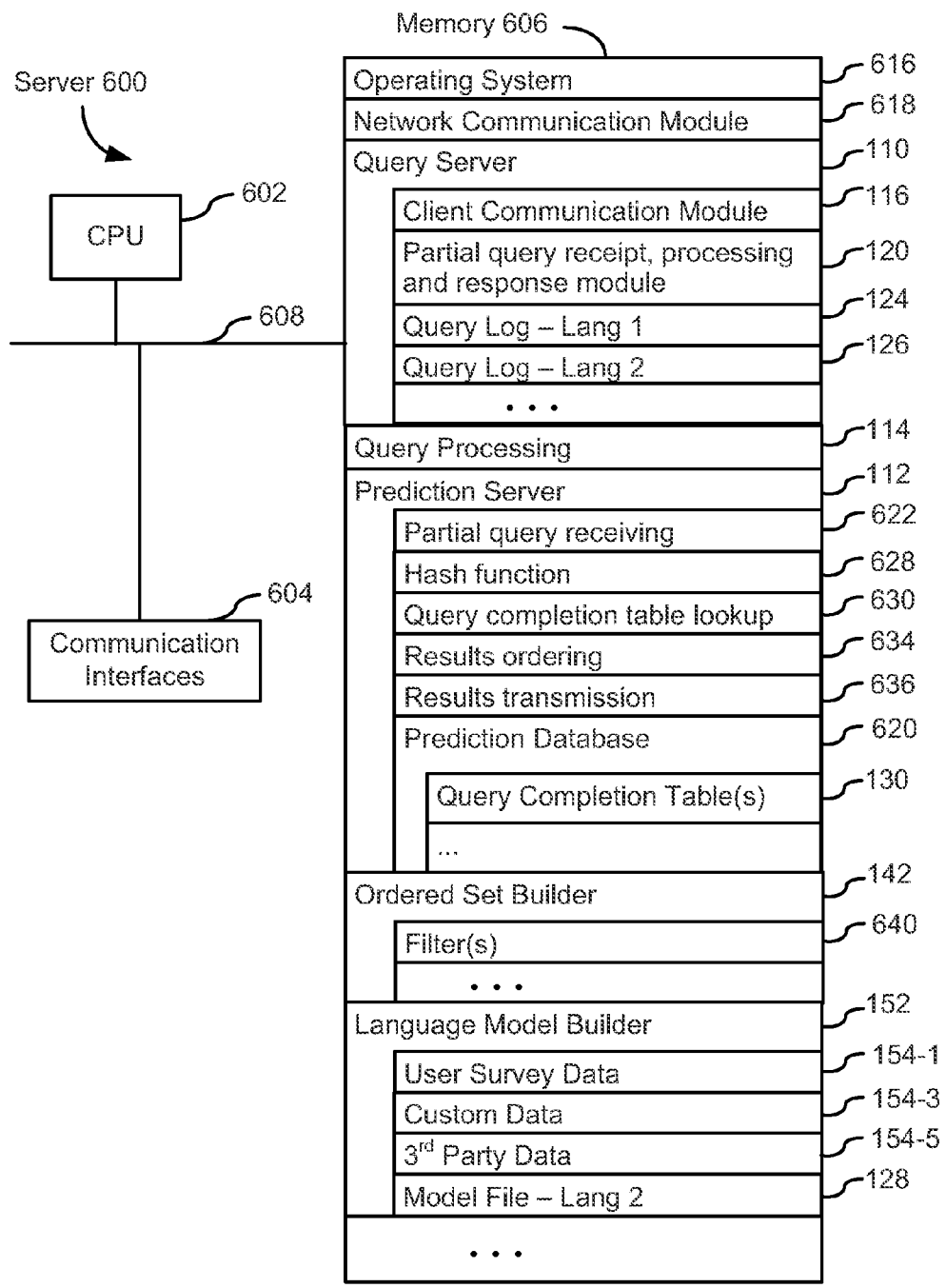
FIG. 6 is a block diagram of a server system in accordance with some embodiments.

FIG. 6 depicts an embodiment of a server system 600 that implements the methods described above. The server system 600 corresponds to the search engine 108 in FIG. 1 and the search engine 108 in FIG. 4A. The server system 600 includes one or more processing units (CPU's) 602, one or more network or other communications interfaces 604, memory 606, and one or more communication buses 608 for interconnecting these components. The communication buses 608 may include circuitry (sometimes called a chipset) that interconnects and controls communications between system components.

Memory 606 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 606 may optionally include mass storage that is remotely located from CPU's 602. Memory 606, or alternately the non-volatile memory device(s) within memory 606, comprises a computer readable storage medium. Memory 606 or the computer readable storage medium of memory 606 stores the following elements, or a subset of these elements, and may also include additional elements:

- an operating system 616 that includes procedures for handling various basic system services and for performing hardware dependent tasks;
- a network communication module (or instructions) 618 that is used for connecting the server system 600 to other computers via the one or more communications network interfaces 604 and one or more communications networks, such as the Internet, other wide area networks, local area networks, metropolitan area networks, and so on;
- a query server 110 for receiving, from a client, partial search queries and complete search queries and conveying responses;

a prediction server 112 for receiving, from the query server 110, partial search queries and for producing and conveying responses;

an ordered set builder 142 for populating the query completion tables 130 for the query server 110; and a language model builder 152 for generating the model file 128 using the user survey data 154-1, the custom data 154-3, and the 3rd-party data 154-5.

The query server 110 may include the following elements, or a subset of these elements, and may also include additional elements:

a client communication module (or instructions) 116 that is used for communicating queries and responses with a client;

a partial query receipt, processing and response module (or instructions) 120; and one or more query log 124 and 126 that contains information about queries submitted by a community of users.

The query processing module (or instructions) 114 receives, from the query server 110, complete search queries, and produces and conveys responses. In some embodiments, the query processing module (or instructions) includes a database that contains information including query results and optionally additional information, for example advertisements associated with the query results.

The prediction server 112 may include the following elements, a subset of these elements, and may also include additional elements:

a partial query receiving module (or instructions) 622;
a hash function (or other fingerprint function) 628;
a module (or instructions) for query completion table lookup 630;
a results ordering module (or instructions) 632;
a results transmission module (or instructions) 634; and
a prediction database 620 that may include one or more query completion tables 130.

The ordered set builder 142 may optionally include one or more filters 640.

It should be understood that in some other embodiments the server system 600 may be implemented using multiple servers so as to improve its throughput and reliability. For instance the query logs 124 and 126 could be implemented on a distinct server that communicates with and works in conjunction with other ones of the servers in the server system 600. As another example, the ordered set builder 208 could be implemented in separate servers or computing devices. Thus, FIG. 6 is intended more as functional description of the various features which may be present in a set of servers than as a structural schematic of the embodiments described herein. The actual number of servers used to implement a server system 600 and how features are allocated among them will vary from one implementation to another, and may depend in part on the amount of data traffic that the system must handle during peak usage periods as well as during average usage periods.

Although the discussion herein has been made with reference to a server designed for use with a prediction database remotely located from the search requestor, it should be understood that the concepts disclosed herein are equally applicable to other search environments. For example, the same techniques described herein could apply to queries against any type of information repository against which queries, or searches, are run. Accordingly, the term "server" should be broadly construed to encompass all such uses.

Although illustrated in FIGS. 5 and 6 as distinct modules or components, the various modules or components may be located or co-located within either the server or the client. For example, in some embodiments, portions of prediction server 112, and/or the prediction database 620 are resident on the client system 102 or form part of the client assistant 104. For example, in some embodiments hash function 628 and one or more query completion tables 130 may be periodically downloaded to a client system 102, thereby providing fully client-based processing for at least some partially search queries.

In another embodiment, the client assistant 104 may include a local version of the prediction server 112, for making complete query predictions based at least in part on prior queries by the user. Alternately, or in addition, the local prediction server may generate predictions based on data downloaded from a server or remote prediction server. Further, the client assistant 104 may merge locally generated and remotely generated prediction sets for presentation to the user. The results could be merged in any of a number of ways, for example, by interleaving the two sets or by merging the sets while biasing queries previously submitted by the user such that those queries would tend to be placed or inserted toward the top of the combined list of predicted queries. In some embodiments, the client assistant 104 inserts queries deemed important to the user into the set of predictions. For example, a query frequently submitted by the user, but not included in the set obtained from the server could be inserted into the predictions.

Operations shown in flow charts, such as in FIGS. 2A, 3A-3C, and 4A-4B, and other operations described in this document as being performed by a client system, a server, a search engine or the like correspond to instructions stored in a computer readable storage medium of a respective client system, server or other computer system. Examples of such computer readable storage media are shown in FIG. 5 (memory 506) and FIG. 6 (memory 606). Each of the software modules, programs and/or executable functions described in this document correspond to instructions stored in respective computer readable storage media, and corresponds to a set of instructions for performing a function described above. The identified modules, programs and/or functions (i.e., sets of instructions) need not be implemented as separate software programs, procedures or modules, and thus various subsets of these modules may be combined or otherwise re-arranged in various embodiments.

FIGS. 7A to 7G depict schematic screenshots of a web browser, a web page displayed in a web browser, or other user interface that lists predicted complete queries in English and Chinese corresponding to a user-provided partial Kongping query, in accordance with some embodiments.

Figure 7A:
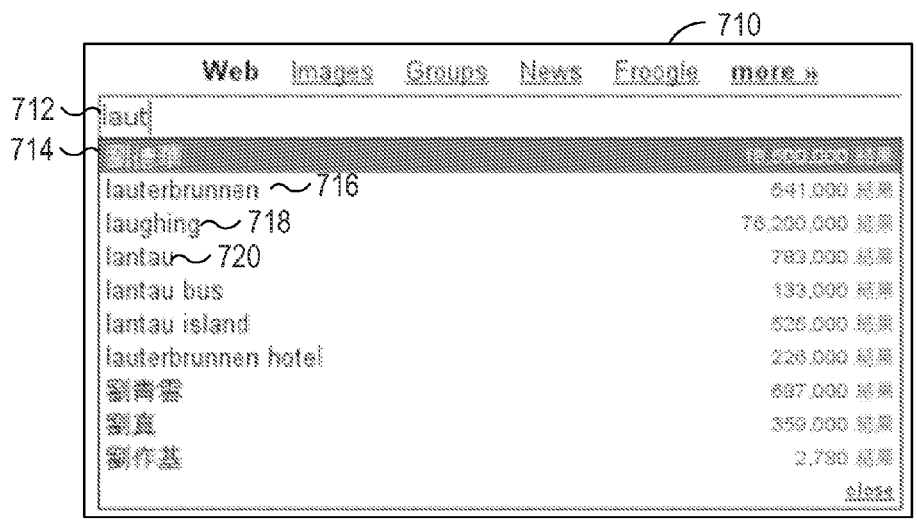

As shown in FIG. 7A, the screenshot 710 is a web page at a client device. There is a user-entered partial query comprising of a Latin-character string "laut" 712 in the textbox of the web page. A remote search engine, in response to the partial query, returns an ordered list of predicted complete queries to the client device. At least a subset of the order list is displayed in the screenshot 710.

In some embodiments, the user who enters the partial query is identified as a Cantonese speaker. For example, the user can make this representation by specifying his or her preferred language to be Cantonese in the user profile submitted to the search engine. Alternatively, the search engine may infer the user's language preference based on the IP address of the client device that submits the partial query. In other words, a partial query from a client computer in Hong Kong indicates that the user who enters the query may be a Cantonese speaker. In yet some embodiments, the search engine may designate that the partial queries submitted to a particular website are from Cantonese speakers. For example, it is assumed that most of the users of the website (http://www- .google.com.hk) are located in Hong Kong or at least related to Hong Kong in some way and they are more likely to enter Kongping since most of them are Cantonese speakers.

In the example shown in FIG. 7A, the Chinese query "劉德華" 714 is displayed as the predicted complete query of highest ranking score because the partial query "laut" is a prefix of the most popular Kongping "lau tak wah" (see, e.g., 209-1 in FIG. 2C) and the Chinese query "劉德華" 714 is at the top of the list (see, e.g., 470-5 in FIG. 4C) corresponding to the string "laut" in the query completion table. The second predicted complete query "lauterbrunnen" 716 refers to a place in Switzerland. Although it is in German, the partial query "laut" is a prefix of "lauterbrunnen." In contrast, the third and fourth complete queries are, respectively, an English word "laughing" 718 and a phonetic representation "lantau" 720 of a Hong Kong island "爛頭." Note that the partial query "laut" is different from the four-character prefixes of "laughing" 718 and "lantau" 720. In other words, an embodiment of the present invention can make fuzzy predictions in multiple languages based on a partial query.

Figure 7B:

In the example shown in FIG. 7B, the partial query is "lauta" 722, which is one-character closer to the Kongping "lau tak wah." As a result, the Chinese query "劉德華" 726 remains at the top of the list and many other complete queries 728 beginning with "劉德華" are promoted over the other queries.

Figure 7C:
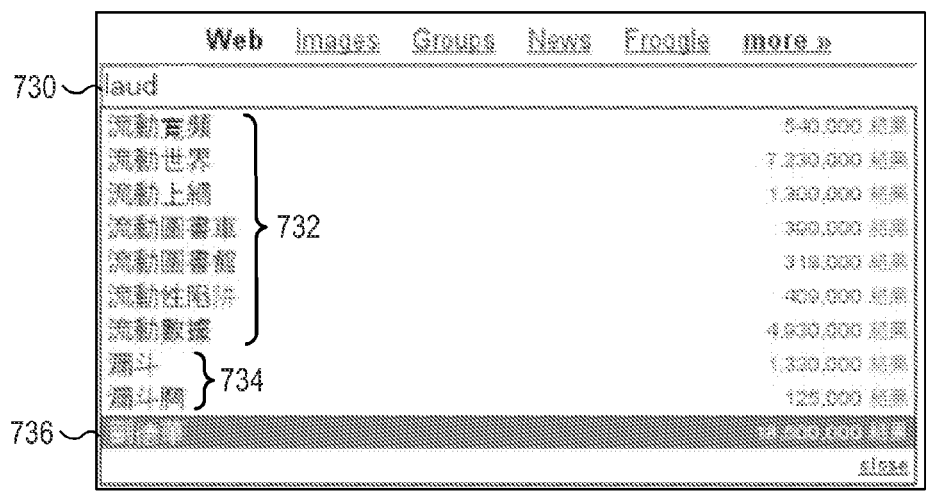

In the example shown in FIG. 7C, the partial query is "laud" 730. Note that this Latin-character string is different from the previous two partial queries because the fourth character is changed from "t" to "d." But according to the model file shown in FIG. 2C, "lau dak wok" is another Kongping of "劉德華" with a lower popularity score. As a result, the Chinese query "劉德華" 736 is listed as one of the predicted complete queries although it is preceded by other more popular ones 732, 734 in connection with the partial query "laud." In other words, an embodiment of the present invention can provide one or more identical predicted complete queries in response to two partial queries where there are one or more differences between the two partial queries. This flexibility is derived from the fact that the model file may have multiple Kongpings for the same Chinese phrase or character.

Figures 7D, 7E:
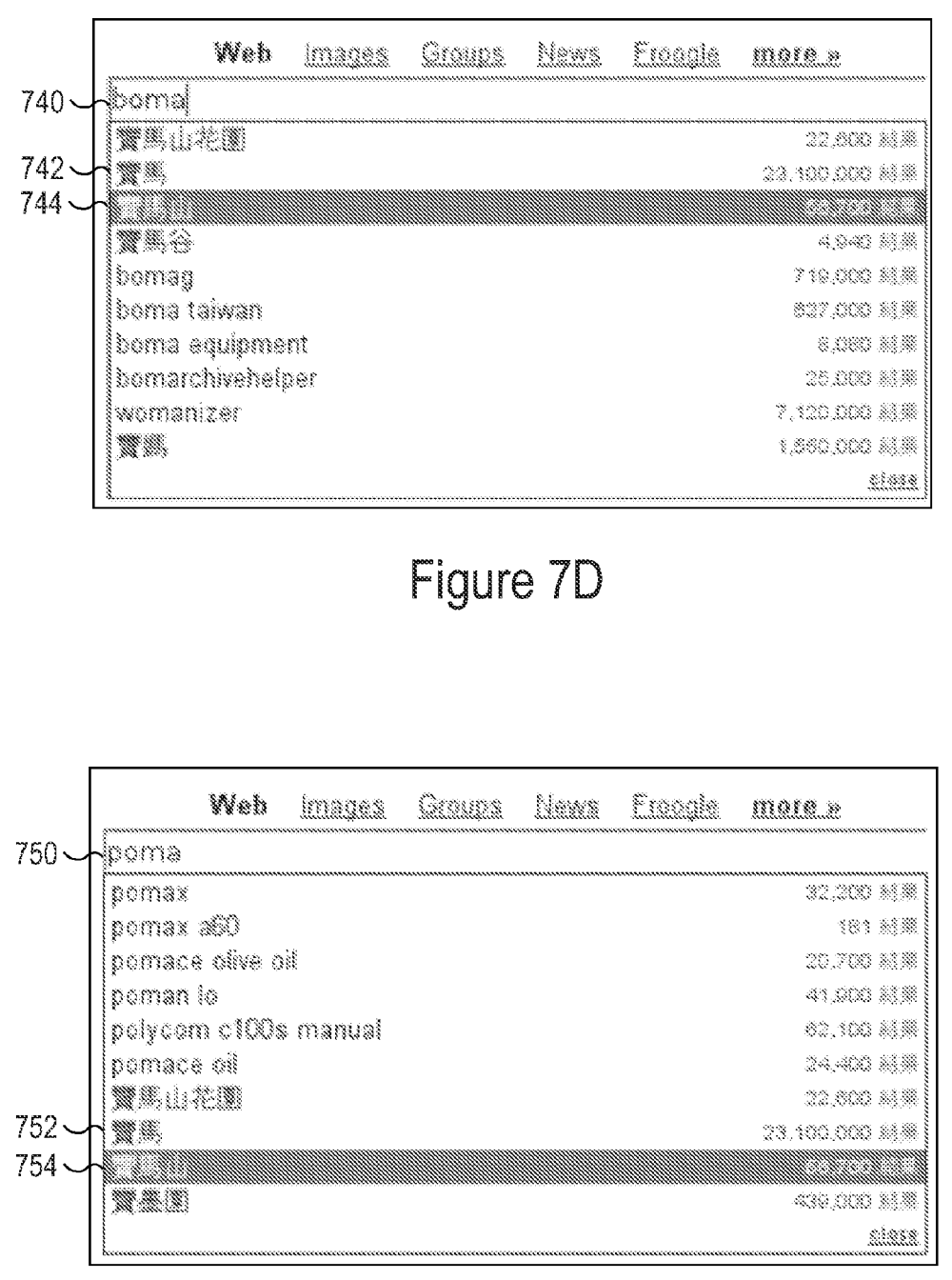

Moreover, an embodiment of the present invention puts no restriction on the location of the differences between different strings. For example, as shown in FIGS. 7D and 7E, respectively, the two partial queries, "boma" 740 and "poma" 750, are different from each other in the beginning character. But in both cases, the search engine returns one or more identical queries such as "寶馬" (742 in FIG. 7D, 752 in FIG. 7E) and "寶馬山" (744 in FIG. 7D, 754 in FIG. 7E). In some embodiments, the locations of the same complete query in response to different partial queries are different because the different partial queries may correspond to different Kongpings that have different popularity scores.

Figure 7F:
Figure 7G:

In the example shown in FIGS. 7F and 7G, the partial queries are "lau ta" 760 and "ltw," respectively. As noted above, the Chinese language predicted complete queries corresponding to these two partial queries are the same, and share the same popularity scores as their concatenated counterpart, "lauta." Thus, the search engine in each case returns a respective set 762, 766 of Chinese language suggestions beginning with "劉德華."

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a server system,
      maintaining a database corresponding to a language specific model that maps non-Latin character strings to one or more corresponding Latin character strings using at least one of user survey data, custom data and third party data, the language specific model based, at least in part, on phonetic representations of respective non-Latin character strings, wherein the model includes, for each of a plurality of respective non-Latin character strings, a plurality of distinct Latin character strings, wherein at least one of the plurality of distinct Latin character strings is based on personal preferences of different users to the phonetic representations of the non-Latin character string;
      receiving, respectively, a first string of Latin characters from a first user and a second string of Latin characters from a second user, wherein there are one or more differences between the first and second strings of Latin characters, wherein the one or more differences occurs due to different preferences of the first user and the second user to the phonetic representations of the same non-Latin character string;
      obtaining from a plurality of previously submitted complete queries and the language specific model, respectively, a first set of predicted complete queries corresponding to the first string of Latin characters and a second set of predicted complete queries corresponding to the second string of Latin characters, wherein there are one or more identical queries in both the first and second sets, wherein at least one identical query of the one or more identical queries is obtained by respectively mapping the first and second strings of Latin characters having the one or more differences to the same non-Latin character string using the language specific model; and
      conveying at least a first subset of the first set to the first user and at least a second subset of the second set to the second user, wherein both the first subset and the second subset include a respective identical predicted complete query, wherein the first subset include a respective identical query.

2. The method of claim 1, wherein the first and second strings of Latin characters correspond to two distinct phonetic representations of the same query in Cantonese.

3. The method of claim 1, wherein the one or more differences include a difference between the respective leading characters of the first and second strings of Latin characters.

4. The method of claim 1, wherein the one or more differences include a difference between the respective ending characters of the first and second strings of Latin characters.

5. The method of claim 1, wherein the first subset of the first set of predicted complete queries includes a plurality of predicted complete queries in the first language and a plurality of predicted complete queries in a second language.

6. The method of claim 5, wherein the plurality of predicted complete queries in the first language are for concurrent display with the plurality of predicted complete queries in the second language.

7. The method of claim 1, wherein each predicted complete query has a popularity score, further comprising:
conveying, respectively, each of the first and second subsets of predicted complete queries in a respective order based on their respective popularity scores within the same subset.

8. The method of claim 7, wherein the respective identical predicted complete query is preceded by a first number of predicted complete queries in the first subset and by a second number of predicted complete queries in the second subset and the first number is different from the second number.

9. The method of claim 1, further comprising:
applying a hash function to each of the first and second strings of Latin characters to produce a respective hash value; and
performing a lookup operation using the respective hash value to obtain the respective set of predicted complete queries.

10. A computer system for processing query information, comprising:
means for maintaining a database corresponding to a language specific model that maps non-Latin character strings to one or more corresponding Latin character strings using at least one of user survey data, custom data and third party data, the language specific model based, at least in part, on phonetic representations of respective non-Latin character strings, wherein the model includes, for each of a plurality of respective non-Latin character strings, a plurality of distinct Latin character strings, wherein at least one of the plurality of distinct Latin character strings is based on personal preferences of different users to the phonetic representations of the non-Latin character string;
means for receiving, respectively, a first string of Latin characters from a first user and a second string of Latin characters from a second user, wherein there are one or more differences between the first and second strings of Latin characters, wherein the one or more differences occurs due to different preferences of the first user and the second user to the phonetic representations of the same non-Latin character string;
means for obtaining from a plurality of previously submitted complete queries and the language specific model, respectively, a first set of predicted complete queries corresponding to the first string of Latin characters and a second set of predicted complete queries corresponding to the second string of Latin characters, wherein there are one or more identical queries in both the first and second sets, wherein at least one identical query of the one or more identical queries is obtained by respectively mapping the first and second strings of Latin characters having the one or more differences to the same non-Latin character string using the language specific model; and
means for conveying at least a first subset of the first set to the first user and at least a second subset of the second set to the second user, wherein both the first subset and the second subset include a respective identical query.

11. The computer system of claim 10, wherein the first and second strings of Latin characters correspond to two phonetic representations of the same query in Cantonese.

12. The computer system of claim 10, wherein the one or more differences include a difference between the respective leading characters of the first and second strings of Latin characters.

13. The computer system of claim 10, wherein the one or more differences include a difference between the respective ending characters of the first and second strings of Latin characters.

14. The computer system of claim 10, wherein the first subset of the first set of predicted complete queries includes a plurality of predicted complete queries in the first language and a plurality of predicted complete queries in a second language.

15. The computer system of claim 14, wherein the plurality of predicted complete queries in the first language are for concurrent display with the plurality of predicted complete queries in the second language.

16. The computer system of claim 10, wherein each predicted complete query has a popularity score, and the system further includes means for conveying, respectively, each of the first and second subsets of predicted complete queries in a respective order based on their respective popularity scores within the same subset.

17. The computer system of claim 16, wherein the respective identical predicted complete query is preceded by a first number of predicted complete queries in the first subset and by a second number of predicted complete queries in the second subset and the first number is different from the second number.

18. The computer system of claim 10, further including:
means for applying a hash function to each of the first and second strings of Latin characters to produce a respective hash value; and
means for performing a lookup operation using the respective hash value to obtain the respective set of predicted complete queries.

* * * * *